US012598016B2

(12) United States Patent
Li et al.

(10) Patent No.:     US 12,598,016 B2
(45) Date of Patent:          Apr. 7, 2026

(54) COMMUNICATION LINK INITIATION METHOD AND APPARATUS

(71) Applicant: SHENZHEN YINWANG INTELLIGENT TECHNOLOGIES CO., LTD., Shenzhen (CN)

(72) Inventors: Chao Li, Chengdu (CN); Xingxin Zhang, Chengdu (CN); Xuehuan Wang, Chengdu (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 418 days.

(21) Appl. No.: 18/185,839

(22) Filed: Mar. 17, 2023

(65) Prior Publication Data
US 2023/0224057 A1     Jul. 13, 2023

Related U.S. Application Data

(63) Continuation of application No. PCT/CN2020/116351, filed on Sep. 19, 2020.

(51) Int. Cl.
| | |
|---|---|
| *H04J 3/06* | (2006.01) |
| *H04L 1/00* | (2006.01) |
| *H04L 7/10* | (2006.01) |

(52) U.S. Cl.
CPC .......... *H04J 3/0658* (2013.01); *H04L 1/0014* (2013.01); *H04L 7/10* (2013.01)

(58) Field of Classification Search
CPC ..... H04W 88/02; H04J 3/0658; H04J 3/0602; H04L 1/0014; H04L 1/0075; H04L 12/12;
(Continued)

(56) References Cited

U.S. PATENT DOCUMENTS 4,677,614 A * 6/1987 Circo ................... H04L 12/433
                                                          370/518
9,575,917 B1     2/2017 Zhu et al.
(Continued)

FOREIGN PATENT DOCUMENTS

| CN | 105099626 A | 11/2015 |
|---|---|---|
| CN | 106802876 A | 6/2017 |

(Continued)

OTHER PUBLICATIONS

Wang Meiling et al., "Design of Rate-Adaptive Laser Wireless Communication System Based on Ethernet," A Dissertation Submitted in Partial Fulfillment of the Requirements for the Degree of Master of Engineering, May 22, 2019, with the Englsih Abstract, 87 pages.

(Continued)

*Primary Examiner* — Shah M Rahman
(74) *Attorney, Agent, or Firm* — Conley Rose, P.C.

(57)          ABSTRACT

A communication link initialization method includes that a master node sends a first information frame to a slave node. The first information frame includes first synchronization information. The slave node implements synchronization with the master node based on the first synchronization information. The slave node sends a second information frame to the master node. The second information frame includes second synchronization information. The master node implements synchronization with the slave node based on the second synchronization information. The master node sends a third information frame to the slave node. The third information frame is used to indicate a first training information frame. The slave node trains a link between the master node and the slave node based on the third information frame. The slave node sends a fourth information frame to the master node.

20 Claims, 16 Drawing Sheets

(58) Field of Classification Search

CPC ......... H04L 7/043; H04L 7/10; H04L 7/0008; H04L 1/0025; H04L 1/0028; H04L 1/0061; H04L 1/1864; G06F 13/4072; G06F 13/423

See application file for complete search history.

(56) References Cited

U.S. PATENT DOCUMENTS

| | | | |
|---|---|---|---|
| 11,457,422 B2 * | 9/2022 | Jain ........................ | H04L 5/0048 |
| 2007/0076722 A1 | 4/2007 | Ungerboeck et al. | |
| 2007/0086487 A1 * | 4/2007 | Yasuda ................. | H04J 3/0688 |
| | | | 370/503 |
| 2009/0180465 A1 * | 7/2009 | Closset ............ | H04W 56/0015 |
| | | | 370/350 |
| 2010/0303187 A1 | 12/2010 | Kobayashi et al. | |
| 2013/0250976 A1 * | 9/2013 | Lindner ................ | H04J 3/0602 |
| | | | 370/509 |
| 2014/0112339 A1 | 4/2014 | Safranek et al. | |
| 2014/0146833 A1 | 5/2014 | Lusted et al. | |
| 2014/0237323 A1 | 8/2014 | Yu et al. | |
| 2015/0063248 A1 | 3/2015 | Yang et al. | |
| 2015/0139221 A1 * | 5/2015 | Wetmore .......... | H04W 56/0015 |
| | | | 370/350 |
| 2016/0112987 A1 | 4/2016 | Patil et al. | |
| 2016/0337115 A1 * | 11/2016 | Lu ....................... | H04L 12/4035 |
| 2016/0365967 A1 * | 12/2016 | Tu ......................... | H04L 12/413 |
| 2017/0006362 A1 * | 1/2017 | Shang .................. | H04L 12/422 |
| 2017/0046299 A1 | 2/2017 | Isaac et al. | |
| 2017/0280385 A1 * | 9/2017 | Klacar .................. | G06F 1/3296 |
| 2017/0280446 A1 * | 9/2017 | Itagaki .................. | H04L 5/0048 |
| 2019/0066764 A1 * | 2/2019 | Spirkl ................. | G11C 11/4096 |
| 2020/0044882 A1 * | 2/2020 | Itagaki ................. | H04W 72/30 |
| 2020/0328872 A1 | 10/2020 | Shi et al. | |
| 2023/0129780 A1 | 4/2023 | Zhang et al. | |

FOREIGN PATENT DOCUMENTS

| | | | | | |
|---|---|---|---|---|---|
| CN | 106852192 | A | 6/2017 | | |
| CN | 107924377 | A | 4/2018 | | |
| CN | 111405681 | A | 7/2020 | | |
| CN | 111602349 | A | 8/2020 | | |
| EP | 2840729 | A1 | 2/2015 | | |
| JP | S62183228 | A | 8/1987 | | |
| JP | 2016005115 | A | 1/2016 | | |
| JP | 2017188909 | A | 10/2017 | | |
| KR | 20150077215 | A | * 7/2015 | .............. | H04N 5/44 |
| WO | 2013155784 | A1 | 10/2013 | | |
| WO | 2017165657 | A1 | 9/2017 | | |
| WO | 2020055792 | A1 | 3/2020 | | |

OTHER PUBLICATIONS

IEEE Std 802.3ch, "IEEE Standard for Ethernet, Amendment 8: Physical Layer Specifications and Management Parameters for 2.5 GB/s, 5 GB/s, and 10 GB/s Automotive Electrical Ethernet," Jun. 4, 2020, 207 pages.

* cited by examiner

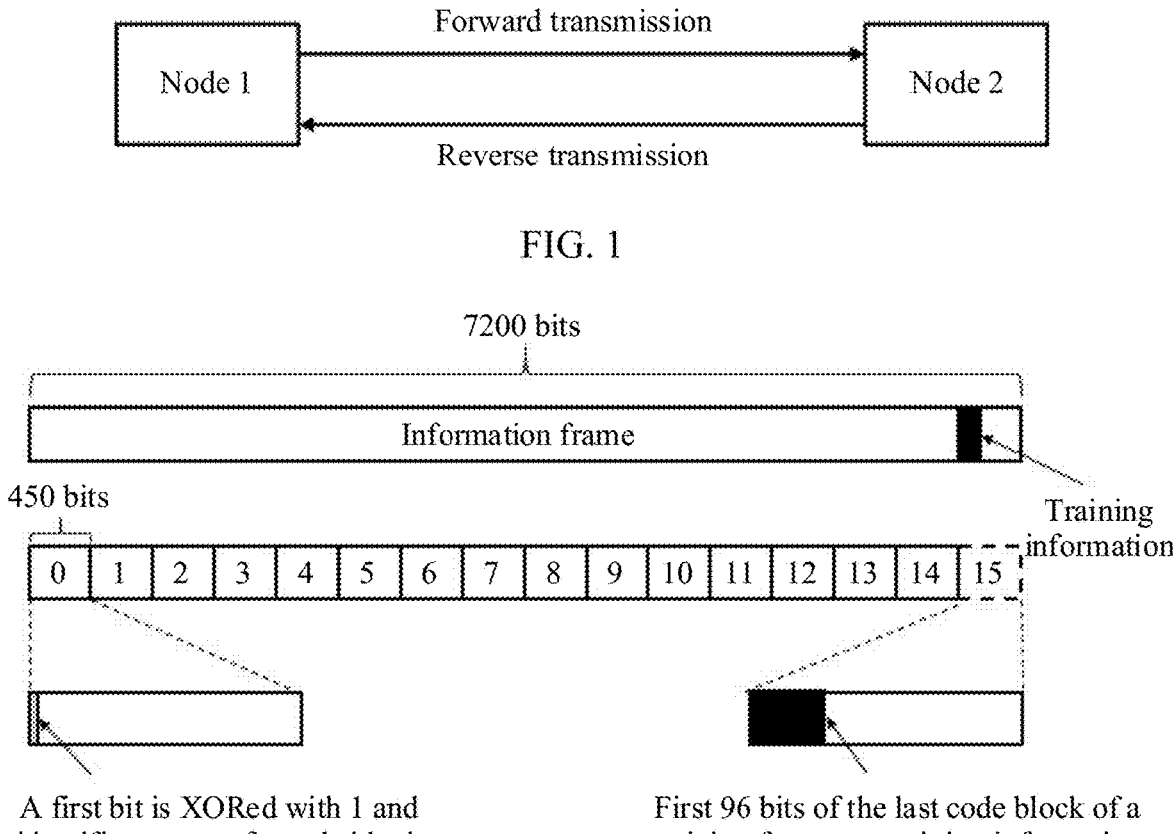
FIG. 1
FIG. 2A
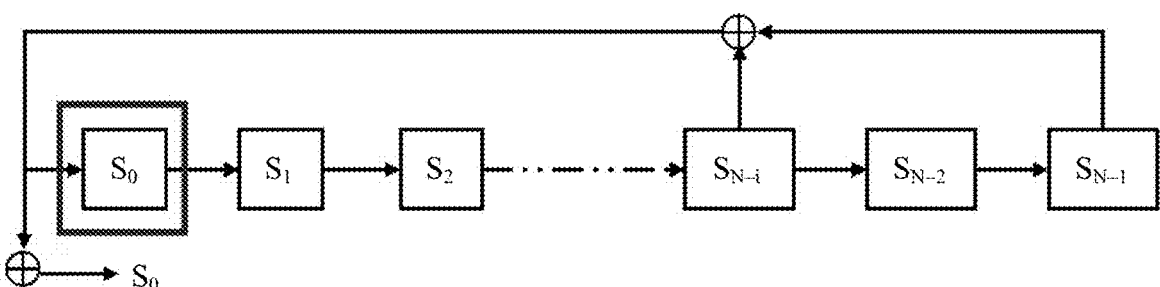
FIG. 2B

| 24 bits | 56 bits | 16 bits |
|---|---|---|
| Start symbol: 0xBBA700 | Count information, state information, and capability information | CRC-16 |

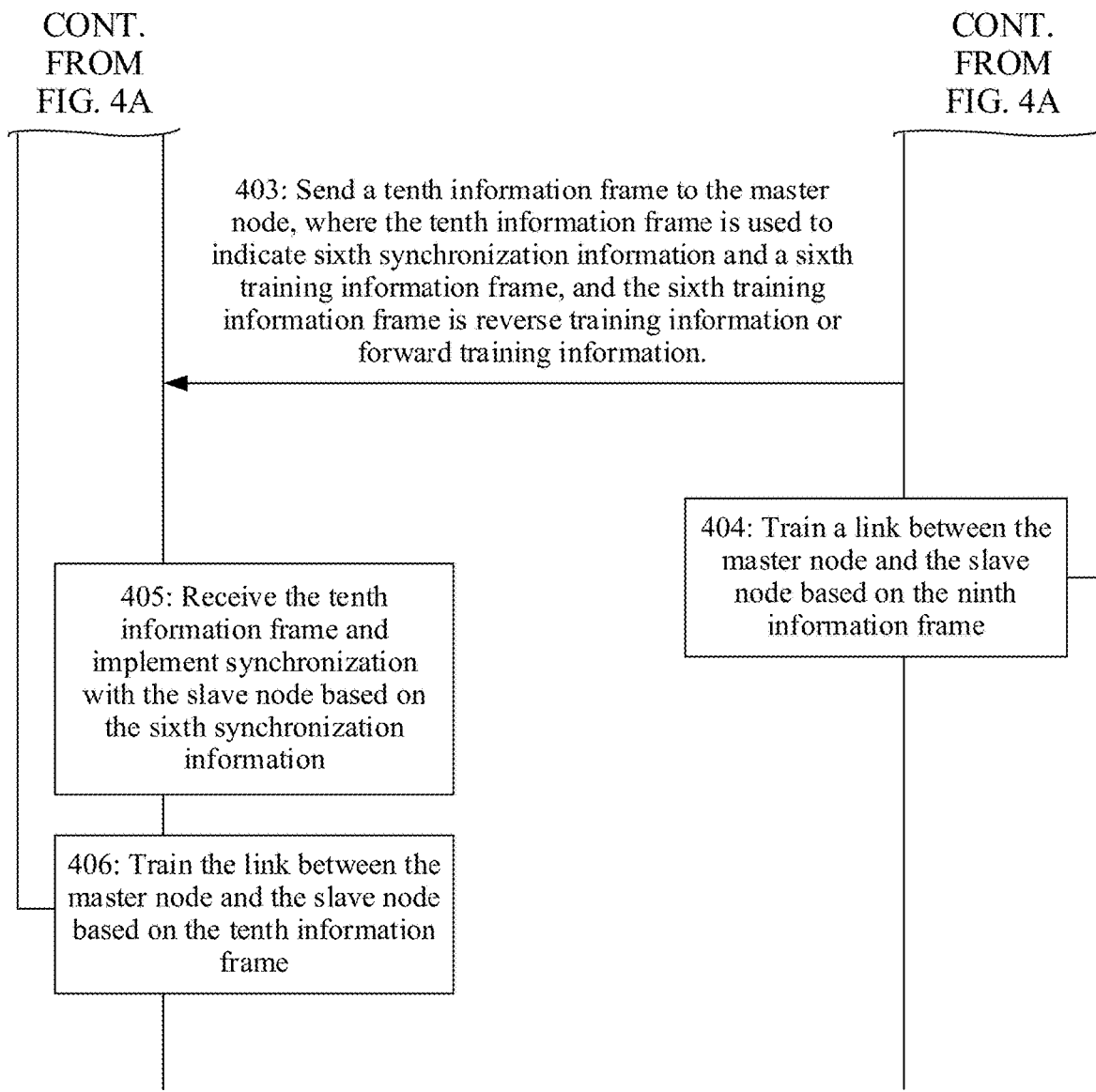

CONT.
FROM
FIG. 4A

CONT.
FROM
FIG. 4A

403: Send a tenth information frame to the master node, where the tenth information frame is used to indicate sixth synchronization information and a sixth training information frame, and the sixth training information frame is reverse training information or forward training information.

404: Train a link between the master node and the slave node based on the ninth information frame 405: Receive the tenth information frame and implement synchronization with the slave node based on the sixth synchronization information 406: Train the link between the master node and the slave node based on the tenth information frame

FIG. 4B

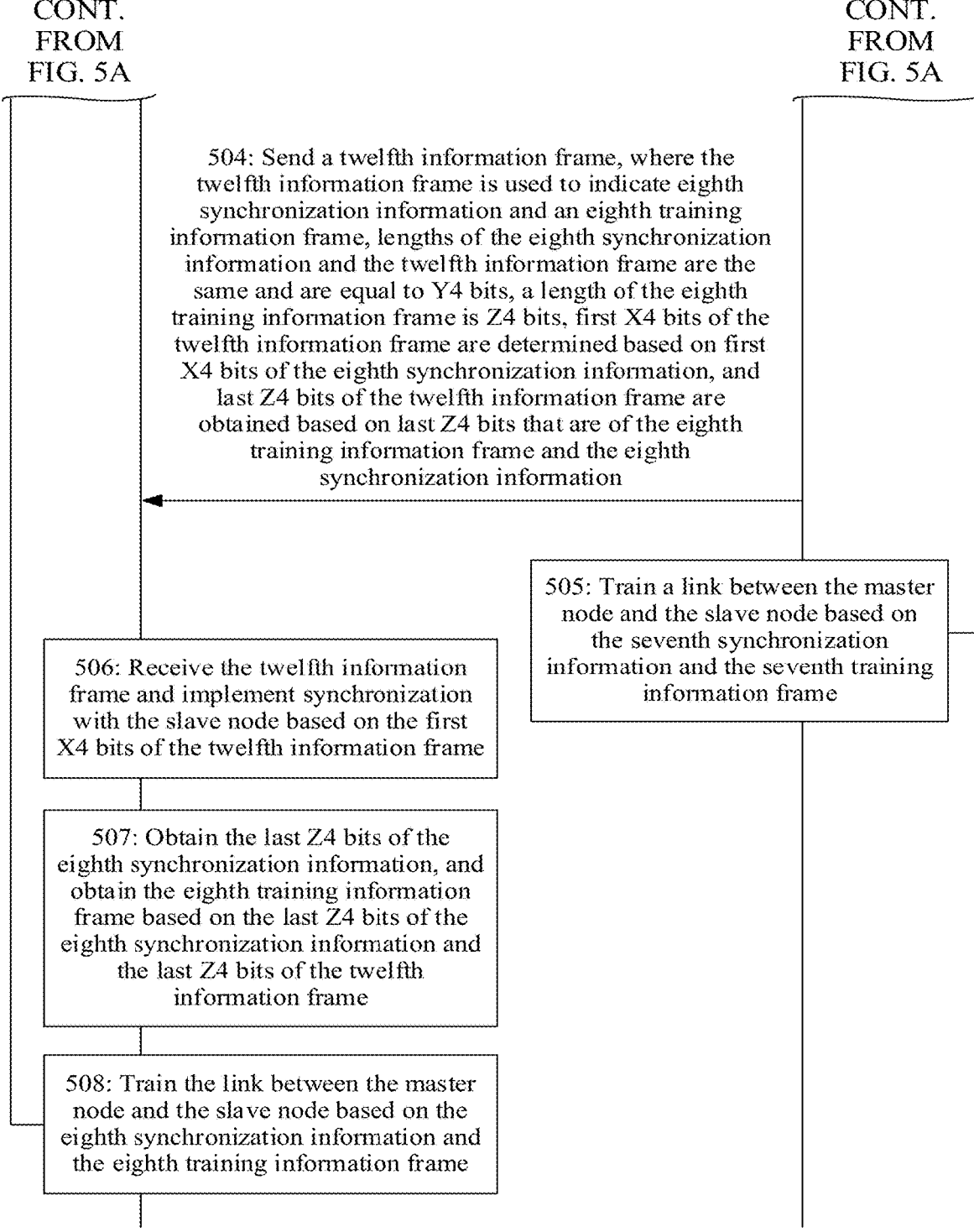

CONT.
FROM
FIG. 5A

CONT.
FROM
FIG. 5A

504: Send a twelfth information frame, where the twelfth information frame is used to indicate eighth synchronization information and an eighth training information frame, lengths of the eighth synchronization information and the twelfth information frame are the same and are equal to Y4 bits, a length of the eighth training information frame is Z4 bits, first X4 bits of the twelfth information frame are determined based on first X4 bits of the eighth synchronization information, and last Z4 bits of the twelfth information frame are obtained based on last Z4 bits that are of the eighth training information frame and the eighth synchronization information 505: Train a link between the master node and the slave node based on the seventh synchronization information and the seventh training information frame 506: Receive the twelfth information frame and implement synchronization with the slave node based on the first X4 bits of the twelfth information frame 507: Obtain the last Z4 bits of the eighth synchronization information, and obtain the eighth training information frame based on the last Z4 bits of the eighth synchronization information and the last Z4 bits of the twelfth information frame 508: Train the link between the master node and the slave node based on the eighth synchronization information and the eighth training information frame

COMMUNICATION LINK INITIATION METHOD AND APPARATUS

CROSS-REFERENCE TO RELATED APPLICATIONS

This is a continuation of International Patent Application No. PCT/CN2020/116351 filed on Sep. 19, 2020, the disclosure of which is hereby incorporated by reference in its entirety.

TECHNICAL FIELD

This application relates to the field of communication technologies, and in particular, to a communication link initiation method and an apparatus.

BACKGROUND

In a communication system, before two devices start normal communication, link initialization needs to be completed first. Clock synchronization, scrambling code synchronization, capability negotiation, training and interaction of receiving and sending parameters, and the like mainly need to be implemented, to establish a reliable communication link between the devices.

It is assumed that two devices included in a communication system are respectively referred to as a master node and a slave node. In an initialization phase, a local scrambler of the master node first generates a scrambling code and sends the scrambling code to the slave node. After implementing clock synchronization and scrambling code synchronization with the master node based on the received scrambling code, the slave node generates a scrambling code by using a local scrambler and sends the scrambling code to the master node. Similarly, the master node implements clock synchronization and scrambling code synchronization with the slave node based on the received scrambling code.

In a process in which the master node or the slave node performs synchronization based on the scrambling code, because negation information of some bits (bit) exists in the scrambling code, after the receiving node receives the scrambling code, scrambling code synchronization time may be prolonged, or even the synchronization cannot be implemented. How to improve node synchronization efficiency becomes an urgent problem to be resolved.

SUMMARY

An embodiment of this application provides a communication link initialization method and an apparatus to improve node synchronization efficiency.

According to a first aspect, a communication link initialization method is provided, and the method includes that a master node sends a first information frame to a slave node. The first information frame includes first synchronization information. The master node receives a second information frame from the slave node. The second information frame includes second synchronization information. The master node implements synchronization with the slave node based on the second synchronization information. The master node sends a third information frame to the slave node. The third information frame is used to indicate a first training information frame. The master node receives a fourth information frame from the slave node. The fourth information frame is used to indicate a second training information frame. The master node trains a link between the master node and the slave node based on the fourth information frame.

In this embodiment of this application, synchronization information about performing synchronization between the master node and the slave node for a first time is sent separately from a training information frame such that a synchronization information receiving node can quickly implement a synchronization process with the synchronization information sending node based on the separate synchronization information, which reduces impact of the training information frame on node synchronization and improves synchronization efficiency.

In a possible example, a third information frame is further used to indicate third synchronization information, lengths of the third information frame and the third synchronization information are the same and are equal to Y1 bits, a length of the first training information frame is Z1 bits, first X1 bits of the third information frame are determined based on first X1 bits of the third synchronization information, and last Z1 bits of the third information frame are obtained based on the first training information frame and last Z1 bits of the third synchronization information, where X1, Y1, and Z1 are positive integers, and X1+Z1=Y1.

In this embodiment of this application, an information frame includes synchronization information and a bit that indicates a training information frame, and does not include additionally-added partition information or block information bits. In this way, when synchronization is implemented, a register can directly complete synchronization based on the synchronization information. This avoids a problem that synchronization cannot be implemented because an additionally-added bit cannot be identified, and improves efficiency and reliability of node synchronization.

In a possible example, the first training information frame is a forward training information frame, and the second training information frame is a reverse training information frame; or the first training information frame is a reverse training information frame, and the second training information frame is a forward training information frame.

In a possible example, the reverse training information frame includes one or more of a count of remaining reverse training information frames used to indicate a quantity of remaining to-be-sent reverse training information frames; a reverse training information frame type used to identify a type of the reverse training information frame; a pre-emphasis gear used to configure a pre-emphasis level of a second end, where the second end is a node that sends the forward training information frame; a swing gear used to configure a transmit swing of the second end; a media encapsulation protocol (MEP) version number used to indicate a MEP version number supported by a first end, where the first end is a node that sends the reverse training information frame; a maximum quantity of retransmission times used to configure a maximum quantity of retransmission times of information transmission of the second end; a transparent transmission mode indication used to indicate the first end whether to enable a media access code (MAC) transparent transmission mode; active time of a cyclic redundancy check (CRC) code block used to identify active time of a correspondingly-transmitted CRC code block in an information transmission process of the first end that sends the reverse training information frame; a reserved bandwidth for control information transmission used to configure a bandwidth proportion occupied by control information transmission in an information transmission process of the second end; a training verification function indication used to indicate that the first end can jump from a training state to a training verification state, where the training state is a state in which the master node and the slave node perform link training, and the training verification state is a state in which the master node and the slave node verify a result of the link training; a CRC code block size used to identify a size of a CRC code block correspondingly transmitted in the information transmission process of the first end; and a terminator used to identify a termination of the reverse training information frame.

In a possible example, the forward training information frame includes one or more of a count of remaining forward training information frames used to identify a quantity of remaining to-be-sent forward training information frames; a forward training information frame number used to identify a number of the forward training information frame; a forward training information frame type used to identify a type of the forward training information frame; a pre-emphasis gear enabling indication used to identify a pre-emphasis gear used by the second end; a swing gear, used to configure a transmit swing of the first end; a MEP version number used to indicate a MEP version number supported by the second end; a maximum quantity of retransmission times used to configure a maximum quantity of retransmission times of information transmission of the first end; a transparent transmission mode indication used to indicate the second end whether to enable the MAC transparent transmission mode; active time of a CRC code block used to identify active time of a correspondingly-transmitted CRC code block in the information transmission process of the second end; a reserved bandwidth for control information transmission used to configure a bandwidth proportion occupied by control information transmission in the information transmission process of the first end; a training verification function indication used to indicate whether the second end jumps from the training state to the training verification state; a CRC code block size used to identify a size of a CRC code block correspondingly transmitted in the information transmission process of the second end; and a terminator used to identify a termination of the forward training information frame.

In this embodiment of this application, information is added to a training information frame such that more capability negotiation, state control, and parameter exchange can be performed when the training information frame is sent between nodes to perform link training such that a training result achieved in a link training process can meet more scenario requirements, to improve reliability of the link training result.

In a possible example, the method further includes that the master node sends, to the slave node, a fifth information frame that indicates a first count of remaining training information frames. The master node receives, from the slave node, a sixth information frame that indicates a second count of remaining training information frames.

In a possible example, the method further includes that when a count of reciprocal information frames is a first preset value, the master node sends a seventh information frame to the slave node. The seventh information frame includes a first ending identifier used to demarcate a boundary at which the master node jumps to the training verification state. The master node receives an eighth information frame that carries a second ending identifier.

According to a second aspect, a communication link initialization method is provided, and the method includes that a slave node receives a first information frame from a master node. The first information frame includes first synchronization information. The slave node implements synchronization with the master node based on the first synchronization information. The slave node sends a second information frame to the master node. The second information frame includes second synchronization information. The slave node receives a third information frame from the master node. The third information frame is used to indicate a first training information frame. The slave node sends a fourth information frame to the master node. The fourth information frame is used to indicate a second training information frame. The slave node trains a link between the master node and the slave node based on the third information frame.

In a possible example, the fourth information frame is further used to indicate fourth synchronization information, lengths of the fourth information frame and the fourth synchronization information are the same and are equal to $Y2$ bits, a length of the second training information frame is $Z2$ bits, first $X2$ bits of the fourth information frame are determined based on first $X2$ bits of the fourth synchronization information, and last $Z2$ bits of the fourth information frame are obtained based on last $Z2$ bits of the fourth synchronization information and the second training information frame, where $X2$, $Y2$, and $Z2$ are positive integers, and $X2+Z2=Y2$.

In a possible example, the first training information frame is a forward training information frame, and the second training information frame is a reverse training information frame; or the first training information frame is a reverse training information frame, and the second training information frame is a forward training information frame.

In a possible example, the reverse training information frame includes one or more of a count of remaining reverse training information frames used to indicate a quantity of remaining to-be-sent reverse training information frames; a reverse training information frame type used to identify a type of the reverse training information frame; a pre-emphasis gear used to configure a pre-emphasis level of a second end, where the second end is a node that sends the forward training information frame; a swing gear used to configure a transmit swing of the second end; a MEP version number used to indicate a MEP version number supported by a first end, where the first end is a node that sends the reverse training information frame; a maximum quantity of retransmission times used to configure a maximum quantity of retransmission times of information transmission of the second end; a transparent transmission mode indication used to indicate the first end whether to enable a MAC transparent transmission mode; active time of a CRC code block used to identify active time of a correspondingly-transmitted CRC code block in an information transmission process of the first end that sends the reverse training information frame; a reserved bandwidth for control information transmission used to configure a bandwidth proportion occupied by control information transmission in an information transmission process of the second end; a training verification function indication used to indicate that the first end can jump from a training state to a training verification state, where the training state is a state in which the master node and the slave node perform link training, and the training verification state is a state in which the master node and the slave node verify a result of the link training; a CRC code block size used to identify a size of a CRC code block correspondingly transmitted in the information transmission process of the first end; and a terminator used to identify a termination of the reverse training information frame.

In a possible example, the forward training information frame includes one or more of a count of remaining forward training information frames used to identify a quantity of remaining to-be-sent forward training information frames; a forward training information frame number used to identify a number of the forward training information frame; a forward training information frame type used to identify a type of the forward training information frame; a pre-emphasis gear enabling indication used to identify a pre-emphasis gear used by the second end; a swing gear used to configure a transmit swing of the first end; a MEP version number used to indicate a MEP version number supported by the second end; a maximum quantity of retransmission times used to configure a maximum quantity of retransmission times of information transmission of the first end; a transparent transmission mode indication used to indicate the second end whether to enable the MAC transparent transmission mode; active time of a CRC code block used to identify active time of a correspondingly-transmitted CRC code block in the information transmission process of the second end; a reserved bandwidth for control information transmission used to configure a bandwidth proportion occupied by control information transmission in the information transmission process of the first end; a training verification function indication used to indicate whether the second end jumps from the training state to the training verification state; a CRC code block size used to identify a size of a CRC code block correspondingly transmitted in the information transmission process of the second end; and a terminator used to identify a termination of the forward training information frame.

In a possible example, the method further includes that the slave node receives, from the master node, a fifth information frame that indicates a first count of remaining training information frames. The slave node sends, to the master node, a sixth information frame that indicates a second count of remaining training information frames.

In a possible example, the method further includes that the slave node receives, from the master node, a seventh information frame that indicates a first ending identifier. The slave node sends, to the master node, an eighth information frame that indicates a second ending identifier.

In a possible example, that the slave node is further configured to generate the fourth information frame further includes determining, by the slave node, a length of the fourth information frame based on a length of the third information frame, where when the first training information frame is a reverse training information frame and the second training information frame is a forward training information frame, the length of the third information frame is an integer multiple of the length of the fourth information frame, or when the first training information frame is a forward training information frame and the second training information frame is a reverse training information frame, the length of the fourth information frame is an integer multiple of the length of the third information frame, where the length is a time length or a bit length; and generating the fourth information frame based on the length of the fourth information frame.

In this embodiment of this application, a forward information frame and a reverse information frame are set to a same bit length based on a feature of different transmission baud rates of the reverse training information frame and the forward training information frame, and then a total quantity of sent forward information frames and reverse information frames is set based on a transmission baud rate multiple relationship between the reverse training information frame and the forward training information frame. Alternatively, transmission duration of the forward information frame is set to an integer multiple of transmission duration of the reverse information frame such that after transmission of the forward information frame and the reverse information frame is completed, a transmission time difference between the forward information frame and the reverse information frame is within a preset range. This avoids impact on a subsequent information transmission process caused by an excessively large transmission time difference.

According to a third aspect, a communication link initialization method is provided, and the method includes that a master node sends a ninth information frame to a slave node. The ninth information frame is used to indicate fifth synchronization information and a fifth training information frame, and the fifth training information frame is a forward training information frame or a reverse training information frame. The reverse training information frame includes one or more of a count of remaining reverse training information frames, a reverse training information frame type, a pre-emphasis gear, a swing gear, a MEP version number, a maximum quantity of retransmission times, a transparent transmission mode indication, active time of a CRC code block, information about a reserved bandwidth for control information transmission, a training verification function indication, a CRC code block size, and a terminator. The forward training information frame includes one or more of a count of remaining forward training information frames, a forward training information frame number, a forward training information frame type, a pre-emphasis gear enabling indication, a swing gear, a MEP version number, a maximum quantity of retransmission times, a transparent transmission mode indication, active time of a CRC code block, a reserved bandwidth for control information transmission, a training verification function indication, a CRC code block size, and a terminator. The master node receives a tenth information frame from the slave node. The tenth information frame is used to indicate sixth synchronization information and a sixth training information frame, and the sixth training information frame is the reverse training information frame or the forward training information frame. The master node implements synchronization with the slave node based on the sixth synchronization information. The master node trains a link between the master node and the slave node based on the tenth information frame.

According to a fourth aspect, a communication link initialization method is provided, and the method includes that a slave node receives a ninth information frame from a master node. The ninth information frame is used to indicate fifth synchronization information and a fifth training information frame, and the fifth training information frame is a forward training information frame or a reverse training information frame. The reverse training information frame includes one or more of a count of remaining reverse training information frames, a reverse training information frame type, a pre-emphasis gear, a swing gear, a MEP version number, a maximum quantity of retransmission times, a transparent transmission mode indication, active time of a CRC code block, a reserved bandwidth for control information transmission, a training verification function indication, a CRC code block size, and a terminator. The forward training information frame includes one or more of a count of remaining forward training information frames, a forward training information frame number, a forward training information frame type, a pre-emphasis gear enabling indication, a swing gear, a MEP version number, a maximum quantity of retransmission times, a transparent transmission mode indication, active time of a CRC code block, a reserved bandwidth for control information transmission, a training verification function indication, a CRC code block size, and a terminator. The slave node implements synchronization with the master node based on the fifth synchronization information. The slave node sends a tenth information frame to the master node. The tenth information frame is used to indicate sixth synchronization information and a sixth training information frame, and the sixth training information frame is reverse training information or forward training information. The slave node trains a link between the master node and the slave node based on the ninth information frame.

According to a fifth aspect, a communication link initialization method is provided, and the method includes that a master node sends an eleventh information frame to a slave node. The eleventh information frame is used to indicate seventh synchronization information and a seventh training information frame, lengths of the seventh synchronization information and the eleventh information frame are the same and are equal to Y3 bits, a length of the seventh training information frame is Z3 bits, first X3 bits of the eleventh information frame are determined based on first X3 bits of the seventh synchronization information, and last Z3 bits of the eleventh information frame are obtained based on the seventh training information frame and last Z3 bits of the seventh synchronization information, where X3, Y3, and Z3 are positive integers, and X3+Z3=Y3. The master node receives a twelfth information frame from the slave node, and implements synchronization with the slave node based on first X4 bits of the twelfth information frame. The first X4 bits of the twelfth information frame are the same as first X4 bits of the eighth synchronization information. The master node obtains last Z4 bits of the eighth synchronization information, and obtains an eighth training information frame based on the last Z4 bits of the eighth synchronization information and last Z4 bits of the twelfth information frame. Lengths of the twelfth information frame and the eighth synchronization information are the same and are Y4 bits, where X4, Y4, and Z4 are positive integers, and X4+Z4=Y4. The master node trains a link between the master node and the slave node based on the eighth synchronization information and the eighth training information frame.

According to a sixth aspect, a communication link initialization method is provided, and the method includes that a slave node receives an eleventh information frame from a master node, and implements synchronization with the slave node based on first X3 bits of the eleventh information frame. The first X3 bits of the eleventh information frame are the same as first X3 bits of seventh synchronization information. The slave node obtains last Z3 bits of the seventh synchronization information, and obtains a seventh training information frame based on the last Z3 bits of the seventh synchronization information and last Z3 bits of the eleventh information frame. Lengths of the eleventh information frame and the seventh synchronization information are the same and are Y3 bits, where X3, Y3, and Z3 are positive integers, and X3+Z3=Y3. The slave node sends a twelfth information frame to the master node. The twelfth information frame is used to indicate eighth synchronization information and an eighth training information frame. Lengths of the eighth synchronization information and the twelfth information frame are the same and are equal to Y4 bits, a length of the eighth training information frame is Z4 bits, first X4 bits of the twelfth information frame are determined based on first X4 bits of the eighth synchronization information, and last Z4 bits of the twelfth information frame are obtained based on the eighth training information frame and last Z4 bits of the eighth synchronization information, where X4, Y4, and Z4 are positive integers, and X4+Z4=Y4. The slave node trains a link between the slave node and the master node based on the seventh synchronization information and the seventh training information frame.

According to a seventh aspect, a communication apparatus is provided. The apparatus includes a sending module, a receiving module, and a processing module. The sending module is configured to send a first information frame to a slave node. The first information frame includes first synchronization information. The receiving module is configured to receive a second information frame from the slave node. The second information frame includes second synchronization information. The processing module is configured to implement synchronization with the slave node based on the second synchronization information. The sending module is configured to send a third information frame to the slave node. The third information frame is used to indicate a first training information frame. The receiving module is configured to receive a fourth information frame from the slave node. The fourth information frame is used to indicate a second training information frame. The processing module is configured to train a link between a master node and the slave node based on the fourth information frame.

In a possible example, the sending module is further configured to send, to the slave node, a fifth information frame that indicates a first count of remaining training information frames; and the receiving module is further configured to receive, from the slave node, a sixth information frame that indicates a second count of remaining training information frames.

In a possible example, when a count of reciprocal information frames is a first preset value, the sending module is further configured to send a seventh information frame to the slave node. The seventh information frame includes a first ending identifier that is used to demarcate a boundary at which the master node jumps to a training verification state. The receiving module is further configured to receive an eighth information frame that carries a second ending identifier.

According to an eighth aspect, a communication apparatus is provided. The apparatus includes a receiving module, a processing module, and a sending module. The receiving module is configured to receive a first information frame from a master node. The first information frame includes first synchronization information. The processing module is configured to implement synchronization with the master node based on the first synchronization information. The sending module is configured to send a second information frame to the master node. The second information frame includes second synchronization information. The receiving module is further configured to receive a third information frame from the master node. The third information frame is used to indicate a first training information frame. The sending module is further configured to send a fourth information frame to the master node. The fourth information frame is used to indicate a second training information frame. The processing module is further configured to train a link between the master node and a slave node based on the third information frame.

In a possible example, the receiving module is further configured to receive a fifth information frame that indicates a first count of remaining training information frames; and the sending module is further configured to send, to the master node, a sixth information frame that indicates a second count of remaining training information frames.

In a possible example, the receiving module is further configured to receive, from the master node, a seventh information frame that indicates a first ending identifier; and the sending module is further configured to send, to the master node, an eighth information frame that indicates a second ending identifier.

In a possible example, that the processing module is further configured to generate the fourth information frame further includes the processing module determines a length of the fourth information frame based on a length of the third information frame. When the first training information frame is a reverse training information frame and the second training information frame is a forward training information frame, the length of the third information frame is an integer multiple of the length of the fourth information frame, or when the first training information frame is a forward training information frame and the second training information frame is a reverse training information frame, the length of the fourth information frame is an integer multiple of the length of the third information frame. The length is a time length or a bit length. The processing module generates the fourth information frame based on the length of the fourth information frame.

According to a ninth aspect, a communication apparatus is provided. The apparatus includes: a sending module, a receiving module, and a processing module. The sending module is configured to send a ninth information frame to a slave node. The ninth information frame is used to indicate fifth synchronization information and a fifth training information frame, and the fifth training information frame is a forward training information frame or a reverse training information frame. The reverse training information frame includes one or more of a count of remaining reverse training information frames, a reverse training information frame type, a pre-emphasis gear, a swing gear, a MEP version number, a maximum quantity of retransmission times, a transparent transmission mode indication, active time of a CRC code block, information about a reserved bandwidth for control information transmission, a training verification function indication, a CRC code block size, and a terminator. The forward training information frame includes one or more of a count of remaining forward training information frames, a forward training information frame number, a forward training information frame type, a pre-emphasis gear enabling indication, a swing gear, a MEP version number, a maximum quantity of retransmission times, a transparent transmission mode indication, active time of a CRC code block, a reserved bandwidth for control information transmission, a training verification function indication, a CRC code block size, and a terminator. The receiving module is configured to receive a tenth information frame from the slave node. The tenth information frame is used to indicate sixth synchronization information and a sixth training information frame, and the sixth training information frame is the reverse training information frame or the forward training information frame. The processing module is configured to implement synchronization with the slave node based on the sixth synchronization information. The processing module is further configured to train a link between a master node and the slave node based on the tenth information frame.

According to a tenth aspect, a communication apparatus is provided. The apparatus includes a receiving module, a processing module, and a sending module. The receiving module is configured to receive a ninth information frame from a master node. The ninth information frame is used to indicate fifth synchronization information and a fifth training information frame, and the fifth training information frame is a forward training information frame or a reverse training information frame. The reverse training information frame includes one or more of a count of remaining reverse training information frames, a reverse training information frame type, a pre-emphasis gear, a swing gear, a MEP version number, a maximum quantity of retransmission times, a transparent transmission mode indication, active time of a CRC code block, information about a reserved bandwidth for control information transmission, a training verification function indication, a CRC code block size, and a terminator. The forward training information frame includes one or more of a count of remaining forward training information frames, a forward training information frame number, a forward training information frame type, a pre-emphasis gear enabling indication, a swing gear, a MEP version number, a maximum quantity of retransmission times, a transparent transmission mode indication, active time of a CRC code block, a reserved bandwidth for control information transmission, a training verification function indication, a CRC code block size, and a terminator. The processing module is configured to implement synchronization with the master node based on the fifth synchronization information. The sending module is configured to send a tenth information frame to the master node. The tenth information frame is used to indicate sixth synchronization information and a sixth training information frame, and the sixth training information frame is the reverse training information or the forward training information. The processing module is configured to train a link between the master node and a slave node based on the ninth information frame.

According to an eleventh aspect, a communication link initialization apparatus is provided. The apparatus includes a sending module, a receiving module, and a processing module. The sending module is configured to send an eleventh information frame to a slave node. The eleventh information frame is used to indicate seventh synchronization information and a seventh training information frame. Lengths of the seventh synchronization information and the eleventh information frame are the same and are equal to $Y3$ bits, a length of the seventh training information frame is $Z3$ bits, first $X3$ bits of the eleventh information frame are determined based on first $X3$ bits of the seventh synchronization information, and last $Z3$ bits of the eleventh information frame are obtained based on the seventh training information frame and last $Z3$ bits of the seventh synchronization information, where $X3$, $Y3$, and $Z3$ are positive integers, and $X3+Z3=Y3$. The receiving module is configured to receive a twelfth information frame from the slave node, and implement synchronization with the slave node based on first $X4$ bits of the twelfth information frame. The first $X4$ bits of the twelfth information frame are the same as first $X4$ bits of the eighth synchronization information. The processing module is configured to obtain last $Z4$ bits of the eighth synchronization information, and obtain an eighth training information frame based on the last $Z4$ bits of the eighth synchronization information and last $Z4$ bits of the twelfth information frame. Lengths of the twelfth information frame and the eighth synchronization information are the same and are equal to $Y4$ bits, where $X4$, $Y4$, and $Z4$ are positive integers, and $X4+Z4=Y4$. The processing module is further configured to train a link between a master node and the slave node based on the eighth synchronization information and the eighth training information frame.

According to a twelfth aspect, a communication link initialization apparatus is provided, and the apparatus includes a receiving module, a processing module, and a sending module. The receiving module is configured to receive an eleventh information frame from a master node, and implement synchronization with a slave node based on first X3 bits of the eleventh information frame. The first X3 bits of the eleventh information frame are the same as first X3 bits of the seventh synchronization information. The processing module is configured to obtain last Z3 bits of the seventh synchronization information, and obtain a seventh training information frame based on the last Z3 bits of the seventh synchronization information and last Z3 bits of the eleventh information frame. Lengths of the eleventh information frame and the seventh synchronization information are the same and are Y3 bits, where X3, Y3, and Z3 are positive integers, and X3+Z3=Y3. The sending module is configured to send a twelfth information frame to the master node. The twelfth information frame is used to indicate eighth synchronization information and an eighth training information frame. Lengths of the eighth synchronization information and the twelfth information frame are the same and are equal to Y4 bits, a length of the eighth training information frame is Z4 bits, first X4 bits of the twelfth information frame are determined based on first X4 bits of the eighth synchronization information, and last Z4 bits of the twelfth information frame are obtained based on the eighth training information frame and last Z4 bits of the eighth synchronization information, where X4, Y4, and Z4 are positive integers, and X4+Z4=Y4. The processing module is further configured to train a link between the slave node and the master node based on the seventh synchronization information and the seventh training information frame.

According to a thirteenth aspect, an embodiment of this application provides an apparatus. The apparatus includes a communication interface and a processor. The communication interface is used by the apparatus to communicate with another device, for example, to receive and send data or a signal. For example, the communication interface may be a transceiver, a circuit, a bus, a module, or another type of communication interface, and the other device may be a network device. The processor is configured to invoke a group of programs, instructions, or data, to perform the method described in the first aspect, the third aspect, or the fifth aspect. The apparatus may further include a memory, configured to store the programs, instructions, or data invoked by the processor. The memory is coupled to the processor. When executing the instructions or the data stored in the memory, the processor may implement the method described in the first aspect, the third aspect, or the fifth aspect.

According to a fourteenth aspect, an embodiment of this application provides an apparatus. The apparatus includes a communication interface and a processor. The communication interface is used by the apparatus to communicate with another device, for example, to receive and send data or a signal. For example, the communication interface may be a transceiver, a circuit, a bus, a module, or another type of communication interface, and the other device may be a terminal. The processor is configured to invoke a group of programs, instructions, or data, to perform the method described in the second aspect, the fourth aspect, or the sixth aspect. The apparatus may further include a memory, configured to store the programs, instructions, or data invoked by the processor. The memory is coupled to the processor. When executing the instructions or the data stored in the memory, the processor may implement the method described in the second aspect, the fourth aspect, or the sixth aspect.

According to a fifteenth aspect, an embodiment of this application further provides a communication apparatus. The communication apparatus includes a processor, the processor is coupled to a memory, the memory is configured to store instructions, and when the instructions are run, the communication apparatus is enabled to perform the method in any one of the first aspect or the possible implementations of the first aspect, or the communication apparatus is enabled to perform the method in the third aspect, or the communication apparatus is enabled to perform the method in the fifth aspect.

According to a sixteenth aspect, an embodiment of this application further provides a communication apparatus. The communication apparatus includes a processor, the processor is coupled to a memory, the memory is configured to store instructions, and when the instructions are run, the communication apparatus is enabled to perform the method in any one of the second aspect or the possible implementations of the second aspect, or the communication apparatus is enabled to perform the method in the fourth aspect, or the communication apparatus is enabled to perform the method in the sixth aspect.

According to a seventeenth aspect, an embodiment of this application further provides a computer-readable storage medium. The computer-readable storage medium stores computer-readable instructions. When the computer-readable instructions are run on a computer, the computer is enabled to perform the method in any one of the first aspect or the possible implementations of the first aspect, or the computer is enabled to perform the method in the third aspect, or the computer is enabled to perform the method in the fifth aspect.

According to an eighteenth aspect, an embodiment of this application further provides a computer-readable storage medium, configured to store instructions. When the instructions are run on a computer, the computer is enabled to perform the method in any one of the second aspect or the possible implementations of the second aspect, or the computer is enabled to perform the method in the fourth aspect, or the computer is enabled to perform the method in the sixth aspect.

According to a nineteenth aspect, an embodiment of this application provides a chip system. The chip system includes a processor, and may further include a memory, configured to implement the method in any one of the first aspect or the possible implementations of the first aspect, or configured to implement the method in the third aspect, or configured to implement the method in the fifth aspect. The chip system may include a chip, or may include a chip and another discrete device.

According to a twentieth aspect, an embodiment of this application provides a chip system. The chip system includes a processor, and may further include a memory, configured to implement the method in any one of the second aspect or the possible implementations of the second aspect, or configured to implement the method in the fourth aspect, or configured to implement the method in the sixth aspect. The chip system may include a chip, or may include a chip and another discrete device.

According to a twenty-first aspect, an embodiment of this application further provides a computer program product, including instructions. When the computer program product runs on a computer, the computer is enabled to perform the method in any one of the first aspect or the possible implementations of the first aspect, or the computer is enabled to perform the method in any one of the second aspect or the possible implementations of the second aspect, or the computer is enabled to perform the method in the third aspect, the fourth aspect, the fifth aspect, or the sixth aspect.

According to a twenty-second aspect, an embodiment of this application provides a system. The system includes the apparatus in the seventh aspect and the apparatus in the eighth aspect, or includes the apparatus in the ninth aspect and the apparatus in the tenth aspect, or includes the apparatus in the eleventh aspect and the apparatus in the twelfth aspect.

BRIEF DESCRIPTION OF DRAWINGS

To describe the technical solutions in embodiments of this application more clearly, the following briefly describes the accompanying drawings for describing embodiments.

FIG. 1 is a schematic diagram of a framework of a communication system according to an embodiment of this application;

FIG. 2A is a schematic diagram of a structure of an information frame according to an embodiment of this application;

FIG. 2B is a schematic diagram of generating a scrambling code by a shift register according to an embodiment of this application;

FIG. 4A and FIG. 4B are a flowchart of another communication link initialization method according to an embodiment of this application;

FIG. 5A and FIG. 5B are a flowchart of another communication link initialization method according to an embodiment of this application;

DESCRIPTION OF EMBODIMENTS

Figure 2C:
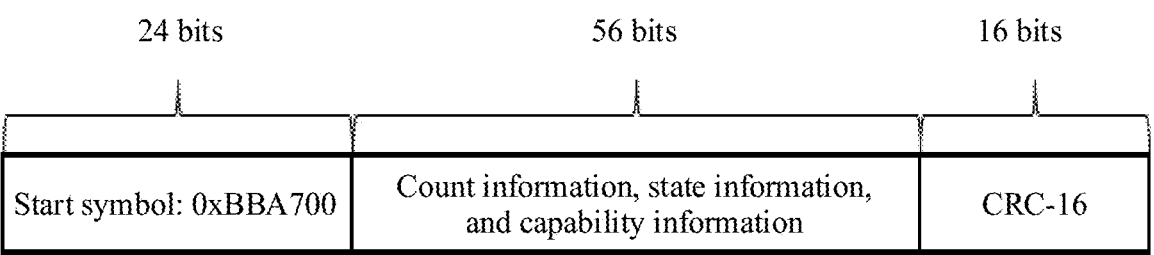
FIG. 2C is a schematic diagram of a training information format according to an embodiment of this application.

The following describes technical solutions in embodiments of this application with reference to the accompanying drawings in embodiments of this application.

In the specification, claims, and accompanying drawings of this application, the terms "first", "second", "third", "fourth" and the like are intended to distinguish between different objects but do not indicate a particular order. In addition, terms "include", "have", and any other variant thereof are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An "embodiment" mentioned in this specification means that a particular characteristic, structure, or feature described with reference to embodiments may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

"A plurality of" means two or more than two. The term "and/or" describes an association relationship between associated objects and represents that three relationships may exist. For example, A and/or B may represent the following three cases: Only A exists, both A and B exist, and only B exists. The character "/" usually indicates an "or" relationship between associated objects.

A communication system in an embodiment of this application is first described. FIG. 1 is a schematic diagram of a framework of a communication system according to an embodiment of this application. As shown in FIG. 1, the communication system includes a node 1 and a node 2. The two nodes are network nodes, and can perform wired communication or wireless communication. A communication link between the node 1 and the node 2 may be a communication link between two nodes in an in-vehicle network, for example, a communication link between a multi-domain controller (MDC) and a sensor, or a communication link between a cockpit domain controller (CDC) and a display. A network element in the in-vehicle network may be a sensor (such as a microphone, a millimeter-wave radar, a laser radar, an ultrasonic radar, a camera, a positioning system such as a Global Positioning System (GPS), an inertial sensor inertial measurement unit (IMU), a speed sensor, an acceleration sensor, a humidity sensor, a light intensity sensor, and the like that are used in a vehicle, and sensor information transmitted by a T-Box); a playback device (such as a display, an external power amplifier, and a speaker); a switch (which provides routing and switching functions, is a switch or router, and aggregates and forwards various data services such as audio and video, synchronization messages, and control messages); a controller/computing center/storage center (which performs computing and control of a function, may be independent or integrated with a gateway, and may be specifically a vehicle-mounted computing platform or a vehicle-mounted computer, a domain controller, a multi-domain controller, such as an autonomous driving controller or an information entertainment controller, or a data center that stores important data, such as a black box and a dashcam in the vehicle).

In addition, the node 1 and the node 2 may alternatively be two nodes in another communication network; for example, nodes in a network such as a mobile terminal, a monitoring device, or a smart home. This is not specifically limited in this embodiment of this application.

In an implementation, synchronization is implemented between nodes by sending an information frame. Specifically, a master node first sends an information frame to a slave node. A fixed length of each information frame is 7200 bits. FIG. 2A is a schematic diagram of a structure of an information frame according to an embodiment of this application. As shown in FIG. 2A, the information frame is split into 16 450-bit code blocks, a first bit of each code block is XORed with 1, and information is trained on first 96 bits XOR at a $16^{th}$ code block of a training frame.

An information frame may include a scrambling code and/or a fixed sequence. A scrambling code bit in an information frame may be generated by using a $0^{th}$ bit of a scrambling code shift register. For details, refer to FIG. 2B. FIG. 2B is a schematic diagram of generating a scrambling code by a shift register according to an embodiment of this application. As shown in FIG. 2B, a scrambling code shift register of a sending node includes N bits (usually 33 bits), which are respectively $S_0$, $S_1$ . . . $S_{N-1}$. The N bits of the scrambling code shift register separately generate a scrambling code, and then an XOR operation is performed on $S_{N-1}$ and $S_{N-i}$ to obtain a new value, which is $S_0'$, where i is a value from 0 to N−2. $S_0'$ is stored in the $0^{th}$ bit of the register, that is, original $S_0$ is replaced, original $S_0$ to $S_{N-2}$ are sequentially moved backward by one bit, and a new scrambling code sequence in the scrambling code shift register is $S_0'$, $S_0$, $S_1$ . . . $S_{N-2}$. Then, the sending node sends a value of the $0^{th}$ bit of the shift register to a receiving node, that is, sends $S_0'$.

The foregoing describes a training frame that includes a scrambling code, and corresponds to the first 15 code blocks in FIG. 2A. For a training information format at a first 96 bits XOR of a last code block that can indicate training information, refer to FIG. 2C. FIG. 2C is a schematic diagram of a training information format according to an embodiment of this application. As shown in FIG. 2C, the training information includes a start symbol of 24 bits, and a sequence corresponding to the start symbol may be 0xBBA700. Other information of 56 bits is further included, including count information, state information, capability information, and the like. The count information is used to indicate a quantity of information frames sent by the node, the state information is used to indicate whether training is completed, and the capability information is used to indicate whether the node includes a low power consumption function and the like. In addition, the training information further includes a CRC bit of 16 bits used to check whether the training information is correctly received.

Figure 2D:
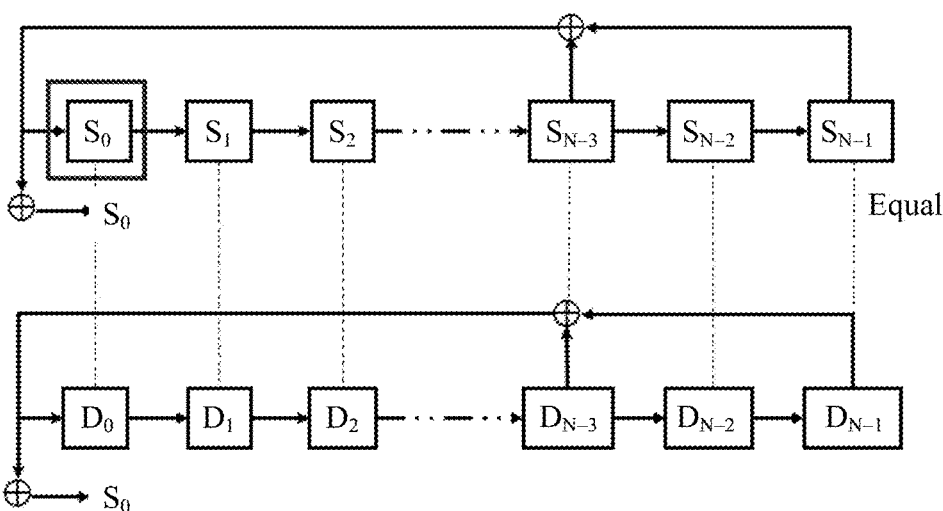
FIG. 2D is a schematic diagram of scrambling code synchronization between a sending node and a receiving node according to an embodiment of this application.

The scrambling code of the sending node is synchronized with that of the receiving node, that is, each bit in shift registers of the sending node and the receiving node is the same. FIG. 2D is a schematic diagram of scrambling code synchronization between a sending node and a receiving node according to an embodiment of this application. As shown in FIG. 2D, it is assumed that a scrambling code shift register of the receiving node includes N bits (usually 33 bits), which are respectively $D_0$, $D_1$ . . . $D_{N-1}$. Similarly, a scrambling code is generated for each bit in the register, an XOR operation is performed on $D_{N-1}$ and $D_{N-i}$ to obtain $D_0'$, and $D_0'$ is output. Assuming that scrambling codes of R bits continuously output by the receiving node are the same as consecutive R bits obtained by the sending node, synchronization between the sending node and the receiving node is completed, where R is far greater than N. It can be learned from the corresponding description in FIG. 2A that some bits of the scrambling code sequence in the information frame are XORed with 1, and are used to identify the start of an RS block. However, when the scrambling code is not synchronized, the receiving node cannot identify the XOR bit. As a result, values in shift registers at two ends may be different, and more scrambling codes need to be transmitted. Different scrambling code bits in the shift registers are replaced to complete synchronization. This prolongs scrambling code synchronization time, and even causes synchronization failure.

In addition, capability parameter negotiation needs to be performed in a link initialization process, training information occupies only 96 bits in every 7200 bits, and content of the training information cannot meet a requirement of a richer scenario.

Figure 3A:
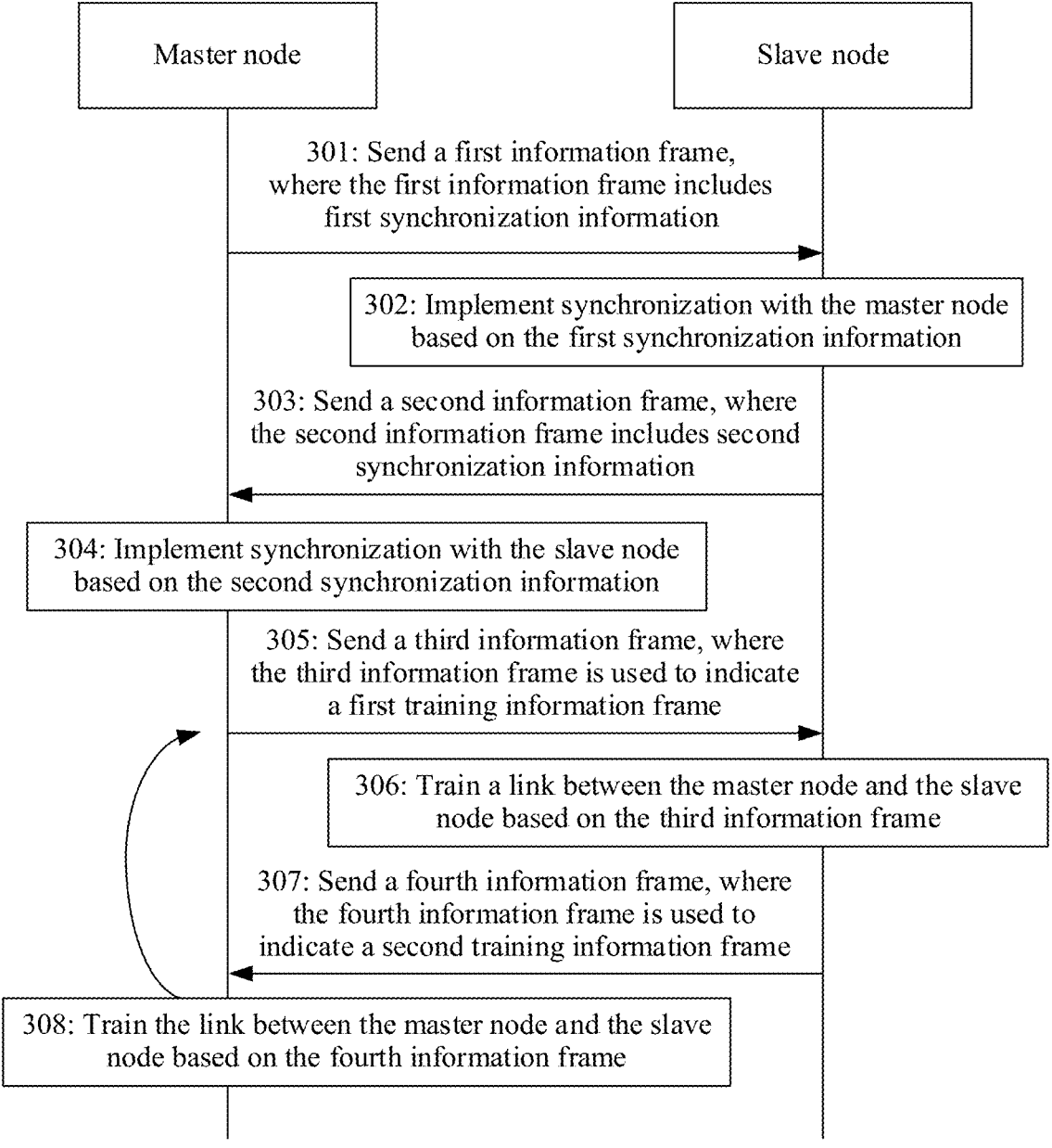
FIG. 3A is a flowchart of a communication link initialization method according to an embodiment of this application.

Based on the foregoing requirement, refer to FIG. 3A. FIG. 3A is a flowchart of a communication link initialization method according to an embodiment of this application. Refer to FIG. 3A. The method includes the following steps.

301: A master node sends a first information frame to a slave node, where the first information frame includes first synchronization information.

302: The slave node receives the first information frame from the master node, and implements synchronization with the master node based on the first synchronization information.

303: The slave node sends a second information frame to the master node, where the second information frame includes second synchronization information.

304: The master node receives the second information frame from the slave node, and implements synchronization with the slave node based on the second synchronization information.

305: The master node sends a third information frame to the slave node, where the third information frame is used to indicate a first training information frame.

306: The slave node receives the third information frame from the master node, and trains a link between the master node and the slave node based on the third information frame.

307: The slave node sends a fourth information frame to the master node, where the fourth information frame is used to indicate a second training information frame.

308: The master node receives the fourth information frame from the slave node, and trains the link between the master node and the slave node based on the fourth information frame.

Figure 3B:
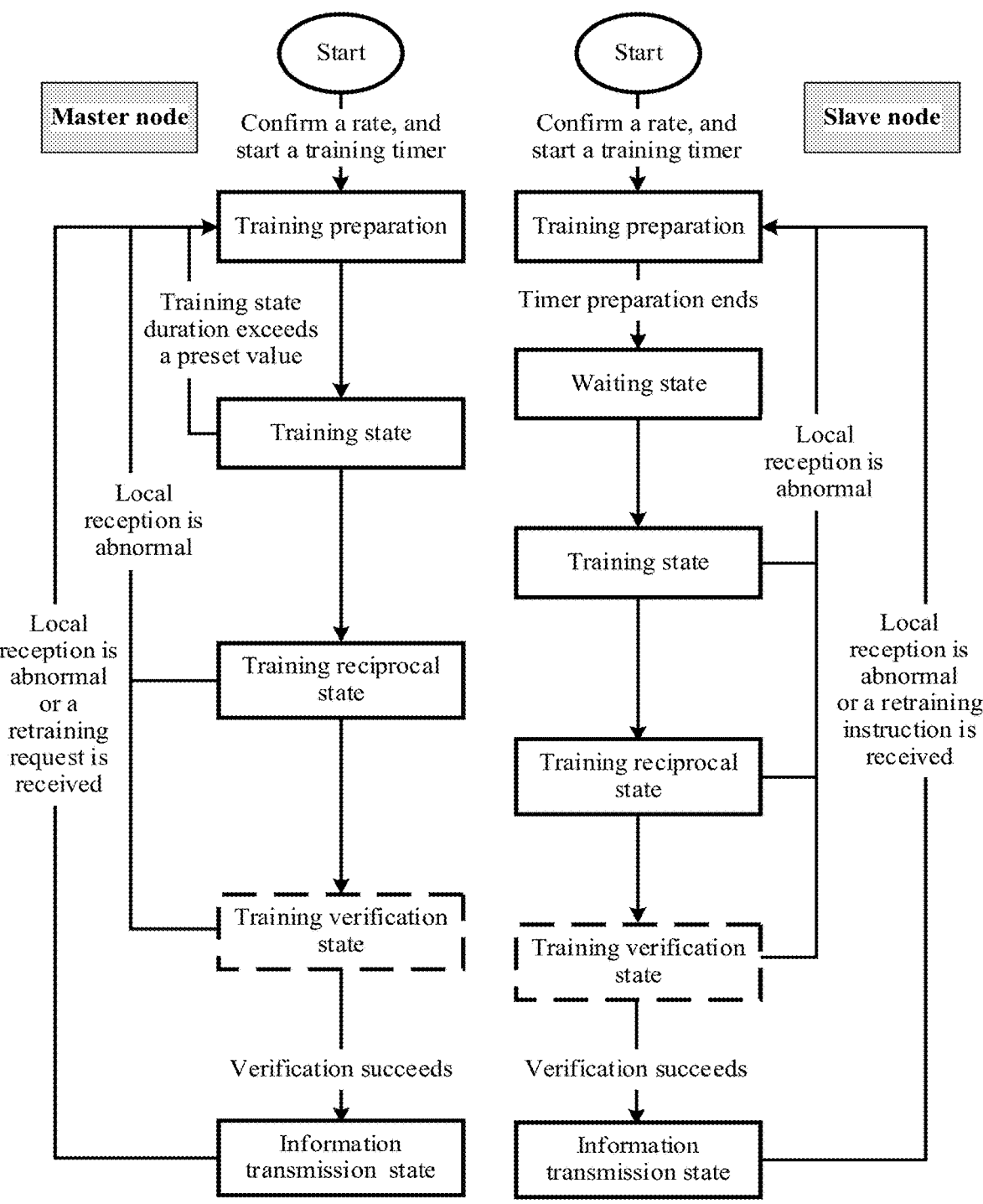
FIG. 3B shows state machines of a master node and a slave node according to an embodiment of this application.

In this embodiment of this application, a node that first sends synchronization information is named the master node, and a node that first receives the synchronization information is named the slave node. The master node and the slave node perform a link initialization phase, which may mainly include processes such as node synchronization, link training, and training result verification. Further, FIG. 3B shows state machines of a master node and a slave node according to an embodiment of this application, and indicates state nodes that the master node and the slave node may pass through when link initialization is performed. After the link initialization starts, the master node and the slave node separately confirm a rate, start a training timer, and enter a training preparation phase. Then, the master node ends a preparation timer, and first enters a training state, that is, the master node starts to send synchronization information and training information to the slave node. After receiving the synchronization information sent by the master node, the slave node completes synchronization with the master node, delimits a location for sending the training information, and then enters the training state, including sending the synchronization information and the training information to the master node. The master node and the slave node exchange training information. After a specific amount of training information is sent, the master node enters a training reciprocal state, that is, the master node sends last remaining several training information frames, and the slave node also enters the training reciprocal state along with the master node. In some cases, the master node enters the training reciprocal state after determining that the training information is converged, and that the training information is converged is manifested as that the training information remains stable and basically does not change. After the master node and the slave node complete transmission of the last several training information frames, if a training verification function is available, both the master node and the slave node synchronously jump to the training verification state. If the training verification function is unavailable, the master node and the slave node directly enter an information transmission state. The information transmission state includes a data transmission process or a control information transmission process. In the training verification state, the master node and the slave node enable the information transmission function except physical layer (PHY) retransmission, load successfully-exchanged transmit and receive parameters, and transmit and receive training verification frames. If the verification succeeds, the system enters the information transmission state according to settings. If the verification fails and maximum training duration is not exceeded, the system jumps to training preparation and retrains the link.

In addition, when the master node is in a training state, if the master node detects that duration of the training state exceeds a preset value (for example, 1 millisecond), the master node enters a training preparation phase and resets link training. In the training reciprocal state and training verification state, if the master node or the slave node detects that local receiving is abnormal and the maximum training duration is not exceeded, the master node or the slave node jumps to the beginning of the training state and re-initializes the link. If the training times out, that is, the maximum training duration for link initialization is exceeded, the training fails.

In this embodiment of this application, the training states of the master node and the slave node are executed. The master node first sends a first information frame to the slave node. The first information frame is a frame that carries the first synchronization information, and the synchronization information may be the foregoing scrambling code, or may be another agreed synchronization sequence. A length of the first information frame may be 7200 bits described above, or may be another length. This is not limited in this embodiment of this application. The first information frame does not include (or indicate) the training information. In this way, after receiving the first training frame, the slave node does not need to detect the training information, and does not need to obtain the training information to perform link training. This can effectively improve efficiency of implementing clock synchronization (or scrambling code synchronization) between the slave node and the master node. Similarly, the slave node sends, to the master node, a second information frame that carries the second synchronization information but does not include (or indicate) the training information. After receiving the information frame, the master node implements synchronization with the slave node based on the second synchronization information in the information frame.

After the master node and the slave node implement synchronization, the master node sends a third information frame to the slave node. The third information frame may be used to indicate the first training information frame. After receiving the third information frame, the slave node performs link training with the master node based on information indicated by the first training information frame in the third information frame. Similarly, the slave node sends, to the master node, a fourth information frame that may be used to indicate the second training information frame. After receiving the fourth information frame, the master node performs link training with the slave node based on information included in the second training information frame in the fourth information frame.

It can be learned that, in this embodiment of this application, the synchronization information for first synchronization performed by the master node and the slave node is sent separately from the training information frame such that the synchronization information receiving node can quickly implement a synchronization process with the synchronization information sending node based on the separate synchronization information, to reduce impact of the training information frame on node synchronization and improves the synchronization efficiency.

Optionally, the third information frame is further used to indicate third synchronization information, lengths of the third information frame and the third synchronization information are the same and are equal to Y1 bits, a length of the first training information frame is Z1 bits, first X1 bits of the third information frame are determined based on first X1 bits of the third synchronization information, and last Z1 bits of the third information frame are obtained based on the first training information frame and last Z1 bits of the third synchronization information, where X1, Y1, and Z1 are positive integers, and $X1+Z1=Y1$.

Optionally, the fourth information frame is further used to indicate fourth synchronization information, lengths of the fourth information frame and the fourth synchronization information are the same and are equal to Y2 bits, a length of the second training information frame is Z2 bits, first X2 bits of the fourth information frame are determined based on first X2 bits of the fourth synchronization information, and last Z2 bits of the fourth information frame are obtained based on last Z2 bits of the fourth synchronization information and the second training information frame, where X2, Y2, and Z2 are positive integers, and $X2+Z2=Y2$.

Figure 3C:
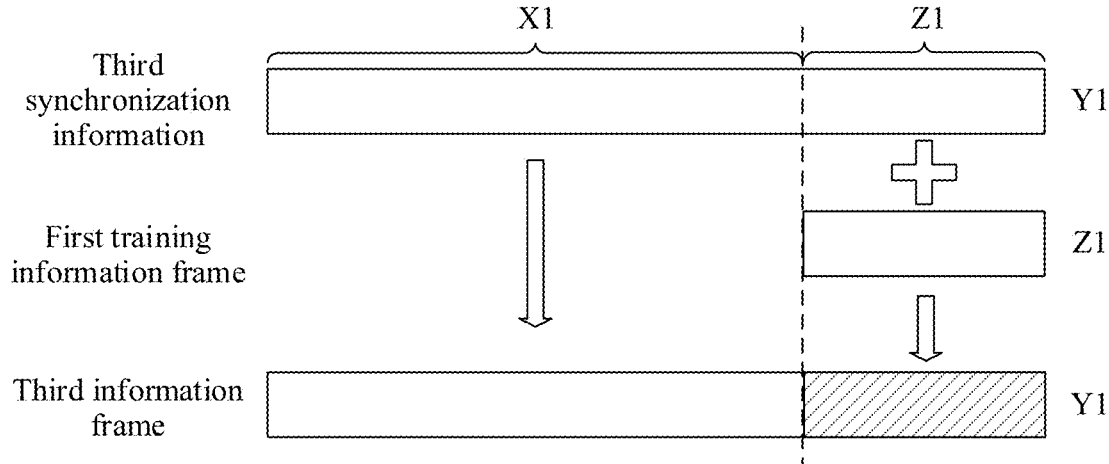
FIG. 3C is a schematic diagram of a third information frame composition according to an embodiment of this application.

The third information frame may be used to indicate the first training information frame and the third synchronization information. Further, for a schematic diagram of a composition structure of the third information frame, refer to FIG. 3C. As shown in FIG. 3C, a length of the third synchronization information is Y1 bits, where the first X1 bits may be directly added to the third information frame, and the last Z1 bits are combined with the first training information frame to generate the last Z1 bits of the third information frame. The combination manner may be XOR, bitwise AND, bitwise OR calculation, or the like. After the slave node receives the third information frame, when the first synchronization information is preset to be completely the same as the third synchronization information, the slave node may determine the third synchronization information based on the previously obtained first synchronization information, and then obtain the third training information frame based on the last Z1 bits of the third synchronization information. When the first synchronization information is not preset to be completely the same as the third synchronization information, the slave node may complete synchronization with the master node based on the first X1 bits of the third information frame, that is, the first X1 bits of the third synchronization information. Then, the last Z1 bits of the third synchronization information are obtained according to a local scrambler generation rule (alternatively, the last Z1 bits of the third synchronization information may be a known fixed sequence). Finally, the third training information frame is obtained by demodulating the last Z1 bits of the third information frame based on the last Z1 bits of the third synchronization information.

A component structure of the fourth information frame may also be the same as that of the third information frame, that is, the first X2 bits of the fourth synchronization information form the first X2 bits of the fourth information frame, and the last Z2 bits of the fourth information frame are obtained after the last Z2 bits of the fourth synchronization information is XORed with the second training information frame, where X2+Z2=Y2, and Y2 is the length of the fourth information frame and the length of the fourth synchronization information. The X2 may be equal to or unequal to X1, Z2 may be equal to or unequal to Z1, and Y1 may be equal to or unequal to Y2. This is not limited herein. After receiving the fourth information frame, the master node synchronizes with the slave node in the foregoing same manner, and demodulates to obtain the fourth training information frame.

Figure 3D:
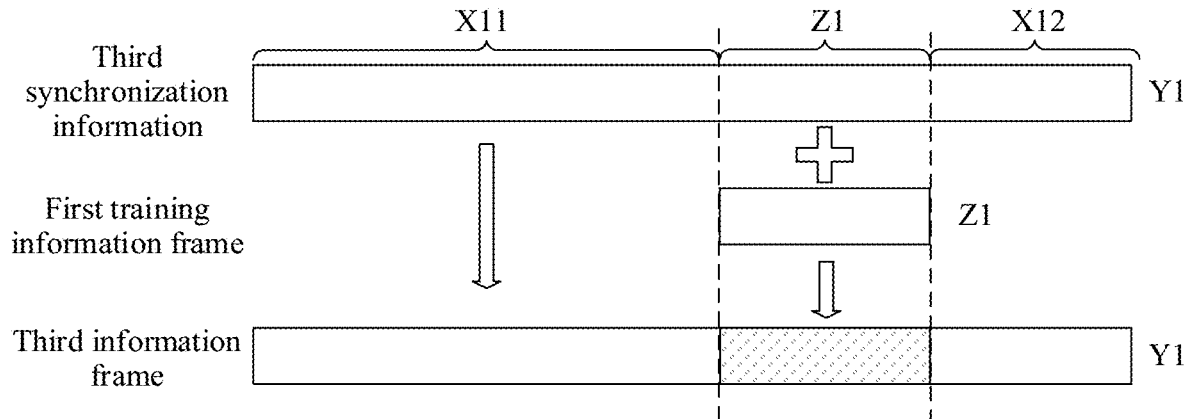
FIG. 3D is a schematic diagram of another third information frame composition according to an embodiment of this application.

Alternatively, FIG. 3D is a schematic diagram of another third information frame composition according to an embodiment of this application. Alternatively, the first training information frame may be combined with middle Z1 bits of the third synchronization information to obtain middle Z1 bits of the third information frame. Then, first X11 bits and last X12 bits of the third information frame are respectively obtained by filling first X11 bits and last X12 bits of the third synchronization information. Similarly, a total length of the third information frame is equal to a total length Y1 of the third synchronization information.

Similarly, Z1 bits of fourth training information frame indicated in the fourth information frame may also be located in the middle of the fourth information frame, and first X21 bits and last X22 bits of the fourth information frame are respectively obtained by filling first X21 bits and last X22 bits of the fourth synchronization information. A total length of the fourth information frame is as follows: Y1=X21+X22+Z1.

In this embodiment of this application, an information frame includes synchronization information and a bit that indicates a training information frame, and does not include additionally-added partition information or block information bits. In this way, when synchronization is implemented, a register can directly complete synchronization based on the synchronization information. This avoids a problem that synchronization cannot be implemented because an additionally-added bit cannot be identified, and improves efficiency and reliability of node synchronization.

Figure 3E:
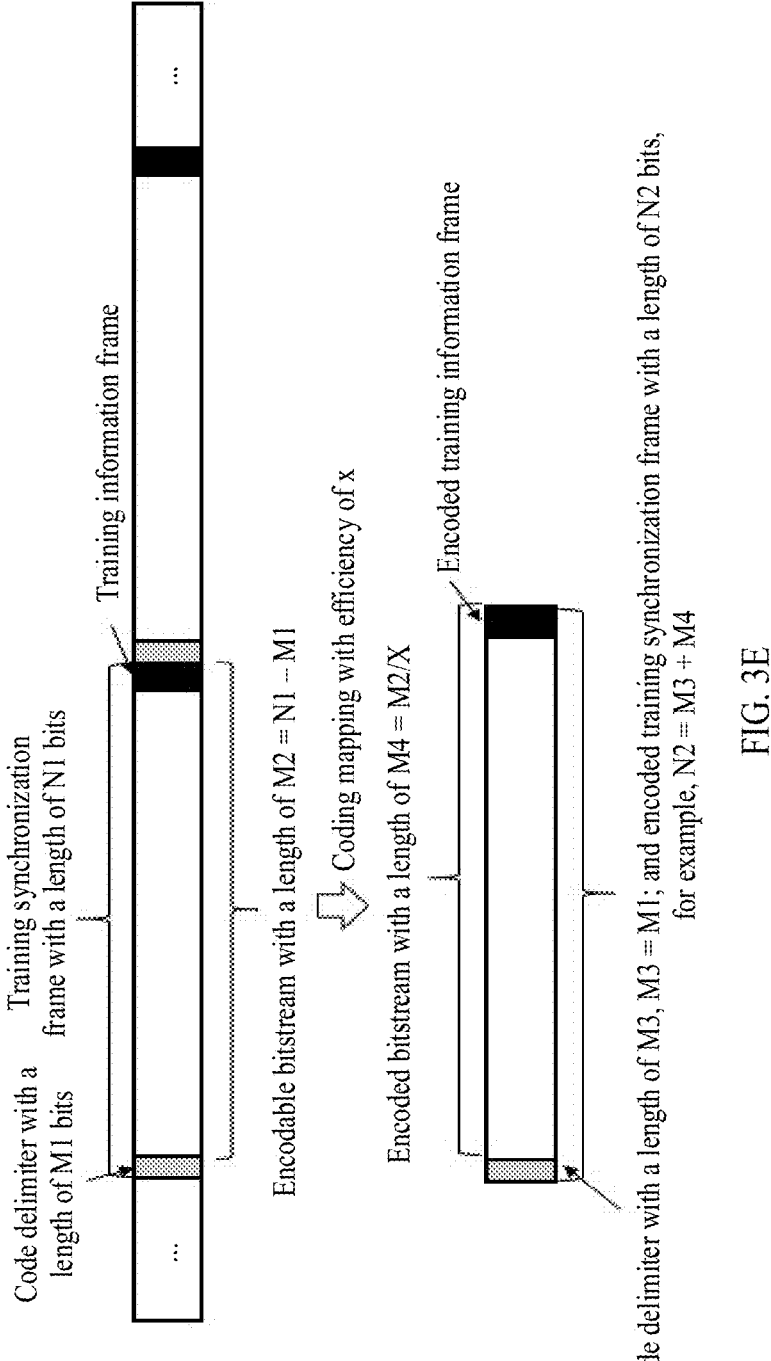
FIG. 3E is a schematic diagram of another structure of an information frame according to an embodiment of this application.

In some cases, to ensure an even probability of occurrence of bit values (0 or 1) in a sent bitstream, an information frame including the synchronization information and the training information frame may be used as an encodable bitstream, and then the encodable bitstream is split into a plurality of codewords. Each codeword may have a length equivalent to 8 bits or 9 bits. Before sending the codeword to a transmission channel, each codeword is encoded into a longer codeword after coding and mapping processing. For example, an original 8-bit or 9-bit codeword is encoded into a 10-bit codeword, and then a long bitstream formed by longer codewords is transmitted to a receiving end, and the receiving end restores the long bitstream based on each long codeword. For example, a 10-bit codeword is restored to an 8-bit or 9-bit codeword to obtain original information frame content. However, after receiving a long bitstream, the receiving end cannot learn a start and end location of each long codeword in the bitstream. As a result, the receiving end cannot restore the long codeword. In this embodiment of this application, a code delimiter may be added before the synchronization information of each information frame, so that the receiving end determines a start and end location of each long codeword after code mapping processing. For details, refer to FIG. 3E. FIG. 3E is a schematic diagram of another information frame structure according to an embodiment of this application. Each information frame starts with an M1-bit code delimiter, and M1 may be a length of a long codeword. In addition, the code delimiter is a fixed sequence that is not repeated with a subsequent long codeword carrying information, so that when receiving the code delimiter, the receiving end identifies an encoding start location and a length of a subsequent long codeword, and further determines start and end locations of each long codeword. Length of the information frame N1=Length of the code delimiter M1+Length of the synchronization information M2. A length of original synchronization information (which may be combined with the training information frame) is M2 bits, and is an encodable length. A transmitting end encodes the encodable bitstream based on encoding efficiency. The encoding efficiency is a ratio of a length of an original codeword to a length of an encoded long codeword. For example, 9B/10B=0.9, indicating that the encoding efficiency is 0.9.

As shown in FIG. 3E, assuming that M1=10 bits, M2=900 bits, and the encodable bitstream is encoded based on the encoding efficiency 0.9, a new bitstream length M4=M2/0.9=900/0.9=1000 bits is obtained. The code delimiter may not be encoded, and is still M1 bits in the new bitstream. Therefore, a bitstream length of a new information frame is M1+M4.

In addition, to facilitate the receiving end to decode the encoded bitstream, the length of the encoded bitstream may be an integer multiple of a single encoded codeword. For example, if a single encoded codeword is 10 bits, the length of the encoded bitstream is an integer multiple of 10.

In this embodiment of this application, the information frame is encoded as an encodable bitstream, so that a probability of occurrence of bit values in the bitstream is even, direct current balance of a transmission signal is ensured, and robustness of the transmission signal is improved. A dedicated code delimiter is added to the information frame to indicate a start location and an end location of each code block in the encoded bitstream, so that efficiency and accuracy of decoding the encoded bitstream by the receiving end can be improved.

The foregoing described information frame, including the synchronization information+the training information frame, or including the code delimiter+the synchronization information+the training information frame, is a possible composition manner of the information frame, and does not constitute a limitation on composition of the information frame in this embodiment of this application. The information frame described below is described by using an example in which the information frame includes the synchronization information+the training information frame. Details are not described again in the following.

After obtaining the first training information frame from the third information frame, the slave node performs link training with the master node based on the first training information frame in combination with the third synchronization information. Link training includes capability negotiation, state control, and parameter exchange. In this embodiment of this application, the training information frame may be classified into a forward training information frame and a reverse training information frame. The forward training information frame is a forward transmission frame, the reverse training information frame is a reverse transmission frame, the forward transmission is high-speed transmission, and the reverse transmission is low-speed transmission. The training information frame can be sent from the master node to the slave node at a high speed and received by the slave node at a low speed, or sent from the master node to the slave node at a low speed and received at a high speed. In this case, the first training information frame sent by the master node may be a forward training information frame, and the second training information frame sent by the slave node to the master node is a reverse training information frame; or the first training information frame sent by the master node to the slave node may be a reverse training information frame, and the second training information frame sent by the slave node to the master node is a forward training information frame.

Optionally, assuming that the first training information frame sent by the master node to the slave node is a reverse training information frame, information that may be included in the reverse training information frame is shown in Table 1:

TABLE 1

| Information included in a reverse training information frame | |
|---|---|
| Start symbol | 24 |
| Count of remaining reverse training information frames | 8 |
| Reserved | 4 |
| Reverse training information frame type | 4 |
| Pre-emphasis gear | 4 |
| Swing gear | 2 |
| Reserved | 2 |
| Local receiving state indication | 1 |
| MEP version | 3 |
| Sleep function indication | 1 |
| Precoding | 3 |
| Maximum quantity of retransmission times | 4 |
| Interleaving depth | 3 |
| Transparent transmission mode indication | 1 |
| Active time of a CRC code block | 4 |
| Reserved bandwidth for control information transmission | 2 |
| RS code block size | 2 |
| Training verification function indication | 1 |
| CRC code block size | 3 |
| Reserved | 20 |
| CRC | 16 |
| Terminator | 16 |

The foregoing table includes information that may be carried in the reverse training information frame. In a specific case, the reverse training information frame may carry all or a part of the information. The number in the table is used to indicate a length of bits occupied by corresponding information. For example, the start symbol may occupy 24 bits.

In the reverse training information frame, some information is specially provided in this embodiment of this application, and specifically includes:

The start symbol is used to identify a start of a reverse training information frame. For example, in FIG. 3C or FIG. 3D), in a first training information frame whose length is Y1 bits, first 24 bits are a start symbol, and a start symbol sequence may be 0xEE E111 or another sequence.

The count of remaining reverse training information frames is used to indicate a quantity of remaining to-be-sent frames of the reverse training information frames. For example, if a count of remaining reverse training information frames is 3, it indicates that sending of three training information frames further needs to be completed after sending of a current reverse training information frame is completed. Alternatively, the count of remaining reverse training information frames may be further used to indicate a reciprocal count of currently-sent reverse training information frames. For example, if a count of remaining reverse training information frames is 4, it indicates that the currently-sent reverse training information frame is the fourth reverse training information frame from the last, and subsequently, the third reverse training information frame from the last to the first reverse training information frame from the last need to be sent. The field may be configured in the following two manners: Manner 1: A quantity of remaining to-be-sent training information frames is configured in a manner of the $n^{th}$ power of 2. For example, 0xFF indicates a quantity of invalid reverse training information frames, and 0 to 0xFE respectively indicate that a quantity of remaining training synchronization frames is 0 to 254. When the value is equal to 0, both ends synchronously jump to the training verification state. Manner 2: A negated scrambling code bit quantity identifier is used. A scrambling code generated by the receiving end (which may be the slave node herein) is XORed with the field, and a quantity of "0" or "1" is used to represent a quantity of remaining reverse training information frames (all negated is an invalid quantity identifier, and negated 0 to 7 scrambling codes represent a quantity of remaining unsent information frames). In this manner, a quantity of remaining to-be-sent reverse training information frames is identified, and no additional quantity of bits needs to be occupied to identify a start and an end of sending the training information frame, thereby reducing storage space overheads. In this embodiment of this application, because each reverse training information frame is indicated by one reverse information frame, bits occupied by the quantity of reverse training information frames may also be used to indicate a quantity of reverse information frames, and states indicated by the two are the same.

The reverse training information frame type is used to identify the type of the reverse training information frame. For example, 0000 indicates that the remaining fields of the current reverse training information frame are training information fields defined in the table, and 0001 to 1111 indicate self-defined reverse training information frames, which are extended by a user.

The pre-emphasis gear is used to configure a pre-emphasis level of a second end. The second end is a node that sends the forward training information frame (or a node that receives the reverse training information frame), and is the slave node herein. A pre-emphasis level of the slave node is added to the reverse training information frame sent by the master node, and is used to indicate a pre-emphasis level that needs to be used by the slave node in a subsequent process of transmitting data or control information, so as to resist a low-pass characteristic of a forward transmission channel. The forward transmission channel is a channel used for forward transmission. Optionally, the pre-emphasis gear may be further used to indicate a pre-emphasis gear that needs to be used when the slave node transmits the forward training information frame.

The swing gear is used to configure a transmit swing of the second end, is a transmit swing of the slave node herein, and is used to configure a voltage range of a signal transmitted to a forward transmission channel in a process of transmitting information of the slave node.

The MEP version number is used to indicate a MEP version number supported by a first end. The first end is a node that sends the reverse training information frame, and is the master node herein.

The maximum quantity of retransmission times is used to configure a maximum quantity of retransmission times of information transmission at the second end. After initialization of the link between the master node and the slave node is completed, normal information transmission (including data transmission or control information transmission) is performed between the two nodes, and the maximum quantity of retransmission times is used to indicate a maximum quantity of times that the slave node can retransmit data or control information.

Figure 3F:
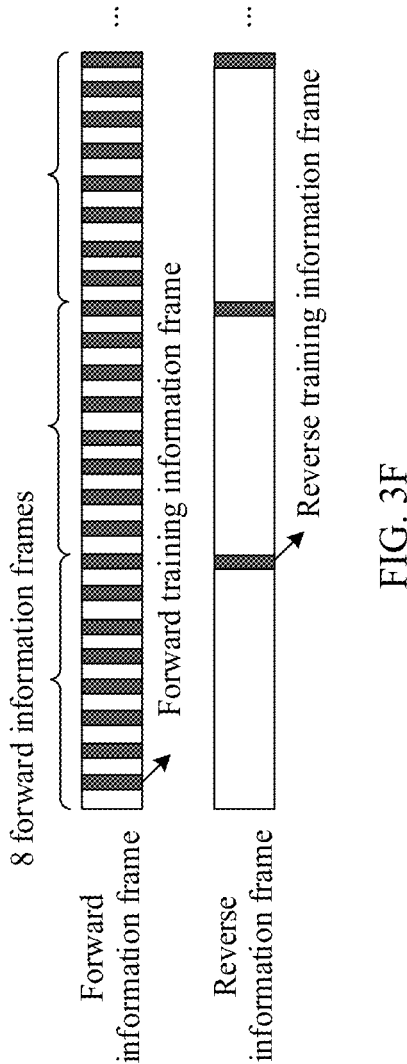
FIG. 3F is a schematic diagram of information frame transmission according to an embodiment of this application.
Figure 3G:
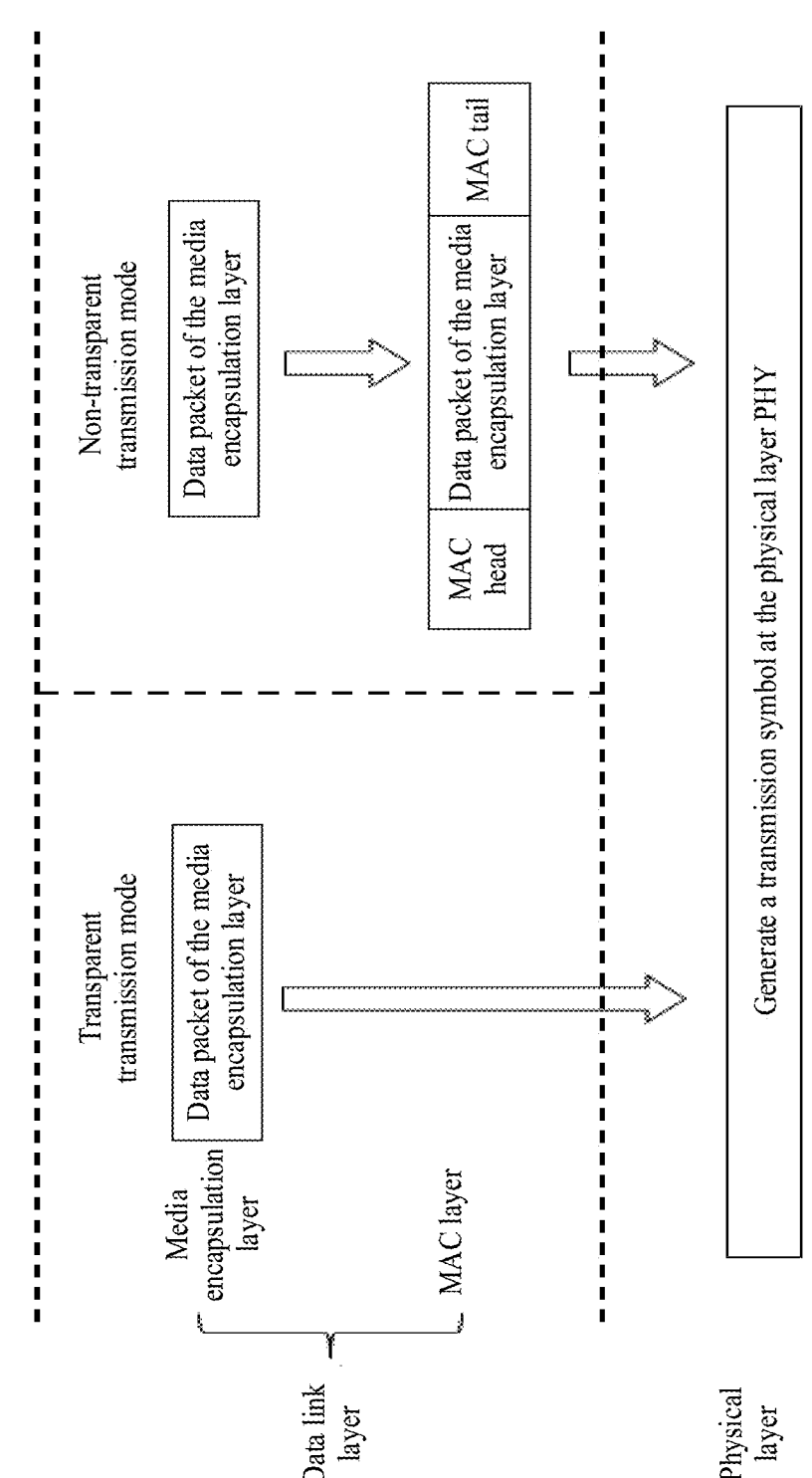
FIG. 3G is a schematic diagram of comparison between a transparent transmission mode and a non-transparent transmission mode according to an embodiment of this application.

The transparent transmission mode indication is used to indicate the first end whether to enable a transparent transmission mode. In the transparent transmission mode, data packets transmitted at an upper layer are directly transmitted to the physical layer for coding and modulation and then transmitted to a transmission channel without being encapsulated and packed by MAC. FIG. 3G is a schematic diagram of comparison between a transparent transmission mode and a non-transparent transmission mode according to an embodiment of this application. A left side in FIG. 3G is a transparent transmission mode, and a data link layer includes a media encapsulation layer and a MAC layer. After being encapsulated at the media encapsulation layer, data packets transmitted at an upper layer are directly sent to a physical layer. The data packets do not need to be encapsulated and packaged at the MAC layer as in the non-transparent transmission mode shown in the right side in FIG. 3G. Alternatively, the transparent transmission mode indication information may be used to indicate whether the second end enables the transparent transmission mode. This is not specifically limited in this embodiment of this application.

Active time of a CRC code block is used to identify active time of a correspondingly-transmitted CRC code block in a subsequent process of transmitting data or control information by the first end that sends the reverse training information frame. Counting starts from sending the CRC code block for the first time, and after the active time of the CRC code block is exceeded, the CRC code block is discarded. For example, if a bit value is 000, it indicates that the active time is time at which the first end sends three CRC code blocks; if a bit value is 001, it indicates that the active time is time at which the first end sends six CRC code blocks; if a bit value is 010, it indicates that the active time is time at which the first end sends nine CRC code blocks; and if a bit value is 011 to 111, it indicates that the active time of the CRC code blocks is user-defined. Alternatively, the active time of the CRC code block may be used to identify active time of a correspondingly-transmitted CRC code block in a subsequent process of transmitting data or control information by the second end that sends the forward training information frame. This is not specifically limited in this embodiment of this application.

The reserved bandwidth for control information transmission is used to configure a bandwidth proportion occupied by control information transmission in the information transmission process of the second end. Specifically, the master node configures a bandwidth proportion that can be occupied by the control information in a process in which the slave node performs data transmission or control information transmission on the master node. Optionally, this parameter may also be replaced with a reserved bandwidth for data transmission, and is used to configure a proportion of bandwidth that can be occupied by data when the slave node transmits data or control information. After the bandwidth proportion of the data (or control information) is determined based on configurations of the parameter of the master node, the bandwidth proportion of the control information (or data) may be obtained through calculation.

The training verification function indication is used to indicate that the first end can jump from the training state to the training verification state. A process in which the master node and the slave node train the link is the training state of the master node and the slave node. A process in which the master node and the slave node verify a training result after completing link training is referred to as the training verification state. The training verification function indication may occupy one bit. When the bit value is 1, it indicates that the master node can jump to the training verification state after the training state is completed, and the jump can be performed after the training process is completed. When the bit value is 0, it indicates that the master node has no training verification state, or it indicates that the master node does not need to jump from the training state to the verification state, but directly enters a subsequent information transmission phase provided that the master node has the training verification state.

The CRC code block size is used to identify a size of a correspondingly-transmitted CRC code block in a subsequent process of transmitting data or control information by the first end. Alternatively, the CRC code block size may be used to identify a size of a correspondingly-transmitted CRC code block in a process of transmitting data or control information by the second end. For example, if the bit value is 000, it indicates that the CRC code block size is 3240 bits; if the bit value is 001, it indicates that the CRC code block size is 1620 bits; and if the bit value is 011 to 111, it indicates that the CRC code block size is user-defined.

The terminator is used to identify a termination of the reverse training information frame. For the last 16 bits training information frame, when the terminator is all set to 1, the training information frame ends by using a negated scrambling code identifier of the last 16 bits training information frame.

In the foregoing information, the pre-emphasis gear and the swing gear are training parameters, and are parameters obtained by the master node through calculation after the master node receives the reverse information frame. The training parameter may further include the local receiving state indication and the like in Table 1. The MEP version is a capability parameter, and is a parameter of an inherent capability of the node. The capability parameter may further include the sleep function indication and the like in Table 1. The maximum quantity of retransmission times, the reserved bandwidth for control information transmission, and the training verification function indication are configuration parameters, and may be configured by a system on chip (SoC). Configuration parameters may further include a precoding codebook selection, an interleaving depth, a Reed-Solomon (RS) forward error correction code block size, and the like in Table 1. In addition, in this embodiment of this application, the CRC check bit in Table 1 may be used to check a bit starting from precoding to a bit before the CRC check bit. In other words, information such as a start symbol and a quantity of remaining training information frames may not be checked by using this method. Training information in each reverse training information frame may occupy 128 bits.

Correspondingly, the second training information frame sent by the slave node to the master node is a forward training information frame, and information that may be included in the forward training information frame is shown in Table 2:

TABLE 2

| Information included in a forward training information frame | |
|---|---|
| Start symbol | 24 |
| Count of remaining forward training information frames | 8 |
| Forward training information frame number | 4 |
| Forward training information frame type | 4 |
| Pre-emphasis gear enabling indication | 4 |
| Swing gear | 2 |
| Reserved | 2 |
| Local receiving state indication | 1 |
| MEP version | 3 |
| Sleep function indication | 1 |
| Reserved | 3 |
| Maximum quantity of retransmission times | 4 |
| Reserved | 3 |
| Transparent transmission mode indication | 1 |
| Active time of a CRC code block | 4 |
| Reserved bandwidth for control information transmission | 2 |
| Reserved | 2 |
| Training verification function indication | 1 |
| CRC code block size | 3 |
| Reserved | 20 |
| CRC | 16 |
| Terminator | 16 |

The foregoing table includes information that may be carried in the forward training information frame. In a specific case, the forward training information frame may carry all or some of the information. In the foregoing forward training information frame, some information is specially provided in this embodiment of this application, and is specifically as follows:

The start symbol is used to identify a start of the forward training information frame. Similarly, the start symbol sequence may be 0xEE E111, or may be another sequence.

The count of remaining forward training information frames is used to identify a quantity of remaining to-be-sent forward training information frames. Corresponding to the count of remaining reverse training information frames in the foregoing reverse training information frames, the parameter is used by the receiving node (the master node herein) to determine a quantity of remaining forward training information frames to be sent by the slave node. In some cases, because a transmission baud rate of the forward training information frame is larger, a plurality of forward training information frames can be transmitted within duration of transmitting one reverse training information frame. Therefore, the count of remaining forward training information frames may also indicate a quantity of groups of remaining to-be-sent forward training information frames, and a quantity of forward training information frames in one group is a quantity of forward training information frames that can be sent within duration of sending one reverse training frame.

The forward training information frame number is used to identify a serial number of a corresponding forward training information frame in a reverse training information frame sending periodicity. As mentioned above, a sending rate of a forward training information frame is higher. Therefore, within duration (a sending periodicity) of sending one reverse training information frame, a peer end may send a plurality of forward training information frames. Based on this reason, a forward training information frame in one reverse training information frame sending periodicity is numbered, so that a receiving end of the forward training information frame can determine, based on the serial number, time for sending the reverse training information frame. For example, if seven forward training information frames can be sent in a sending periodicity of a reverse training information frame, serial numbers of the forward training information frames may be 0 to 6. The master node sends the reverse training information frame in sequence, and after receiving the reverse training information frame, the slave node sends the forward training information frame. Alternatively, the slave node may start to send the forward training information frame to the master node within a preset time range after the master node sends the reverse training information frame. The preset time range may be 1 µs or another smaller value. Similarly, assuming that the master node sends the forward training information frame and the slave node sends the reverse training information frame, the slave node may also send the forward training information frame to the master node within a preset time range after the master node sends a last numbered forward training information frame in a sending periodicity. The sending periodicity is duration for sending one reverse training information frame.

The forward training information frame type is used to identify a type of a currently-transmitted forward training information frame. For example, 0000 indicates that a remaining field of the current forward training information frame is a training information field defined in a table, and 0001 to 1111 indicate a self-defined forward training information frame, which is extended by the user.

The pre-emphasis gear enabling indication is used to identify the pre-emphasis gear used by the second end. The second end is a node that sends the forward training information frame, and is the slave node herein. If the reverse training information frame received by the slave node from the master node includes pre-emphasis gear information and a pre-emphasis gear of the slave node is configured, the pre-emphasis gear enabling indication is added to the forward training information frame sent by the slave node, to indicate the pre-emphasis gear used by the slave node in an information transmission process or another process (including a process corresponding to the training state, or further including a process corresponding to the training verification state). The master node may check, based on the pre-emphasis gear enabling indication, whether the slave node correctly receives the pre-emphasis gear configured by the master node.

The swing gear is used to configure the transmit swing of the first end. The first end is a node that sends the reverse training information frame, and is the master node herein. The master node may configure a swing gear of the slave node by using the reverse training information frame. Correspondingly, the slave node may configure a swing gear of the master node by using the forward training information frame.

The MEP version number is used to indicate the MEP version number supported by the second end.

The maximum quantity of retransmission times is used to configure a maximum quantity of retransmission times of information transmission at the first end. After the initialization of the link between the master node and the slave node is completed, a normal data transmission or control information transmission is performed between the two nodes. The maximum quantity of retransmission times is used to configure a maximum quantity of times that a node sending the reverse training information frame can retransmit data or control information, and herein refers to the maximum quantity of times that the master node can retransmit data or control information.

The transparent transmission mode indication is used to indicate the second end whether to enable the transparent transmission mode, or used to indicate the first end whether to enable the transparent transmission mode. The information and the transparent transmission mode indication information in the reverse training information frame are used to indicate a transparent transmission mode of different ends.

Active time of a CRC code block is used to identify active time of a correspondingly-transmitted CRC code block in the subsequent process of transmitting data or control information by the second end that sends the forward training information frame. Alternatively, active time of the CRC code block may be used to identify active time of a correspondingly-transmitted CRC code block in a subsequent process of transmitting data or control information by the first end that sends the reverse training information frame. The information and the active time information of the CRC code block in the reverse training information frame are used to indicate active time of the CRC code block in an information transmission process of different ends.

The reserved bandwidth for control information transmission is used to configure a bandwidth proportion occupied by control information in the information transmission process of the first end, and herein is a proportion of bandwidth that can be occupied by the control information in a process of transmitting data or control information by the master node. Similarly, the parameter may also be used to configure the reserved bandwidth for data transmission, and is used to determine a proportion of bandwidth that can be occupied by data when the slave node transmits data or control information.

The training verification function indication is used to indicate whether the second end jumps from the training state to the training verification state. Similarly, the training verification function indication may occupy 1 bit. When the bit value is 1, it indicates that the slave node can jump to the training verification state after the training state is completed. When the bit value is 0, it indicates that the slave node does not have the training verification state, or the slave node does not need to enter the training verification state when the slave node has the training verification state, and directly jumps to a next state after the training state is completed, for example, directly jumps to the information transmission state.

The CRC code block size is used to identify a size of a correspondingly-transmitted CRC code block in a subsequent process of transmitting data or control information by the second end. Alternatively, the CRC code block size may be used to identify a size of a correspondingly-transmitted CRC code block in a process of transmitting data or control information by the first end. The information and the CRC code block size information in the reverse training information frame are used to indicate CRC code block sizes in an information transmission process of different ends.

The terminator is used to identify a termination of the forward training information frame. A 16-bit negated scrambling code may be used for calibration.

Similarly, in addition to the foregoing description information, information in the forward training information frame may further include the local receiving state indication, the sleep function indication, a retransmission enable flag of the first end, a CRC check bit, and the like in Table 2. This is not limited in this embodiment of this application. The CRC check bit may be used to check a bit starting from a serial number for training information frame to a bit before the CRC check bit. Training information in each forward training information frame may occupy 128 bits.

The foregoing describes information included in the two types of training information frames by using an example in which the master node sends the reverse training information frame and the slave node sends the forward training information frame. Optionally, the master node may send the forward training information frame and the slave node sends the reverse training information frame. A difference lies only in that the first end in the foregoing description is correspondingly replaced with the slave node (the node that sends the reverse training information frame), and the second end is correspondingly replaced with the master node (the node that sends the forward training information frame).

It can be learned that in this embodiment of this application, information is added to a training information frame, so that more capability negotiation, state control, and parameter exchange can be performed when the training information frame is sent between nodes to perform link training, so that a training result achieved in a link training process can meet more scenario requirements, to improve reliability of the link training result.

The master node and the slave node exchange the third information frame and the fourth information frame for a plurality of times. The slave node obtains the first training information frame based on the received third information frame, and then obtains a related state configuration and a capability parameter of the master node based on information in the first training information frame, or may further determine an information transmission configuration, a state configuration, and the like of the slave node. The master node obtains the second training information frame based on the received fourth information frame, then determines, based on information in the second training information frame, information transmission configuration and state configuration that are performed by the slave node for the master node, and may further obtain a capability parameter and the like of the slave node. The master node and the slave node may send information frames for a plurality of times, to facilitate capability negotiation and parameter training interaction between the two with sufficient information. Then, the master node may send last several information frames to the slave node, and receive last several information frames sent by the slave node at the same time, so as to enter a next node state after completing interaction of the last several information frames. Before sending the last several information frames, the master node may first determine that the training information is converged, that is, determine that the training information remains stable and basically does not change. This indicates that the link training between the master node and the slave node is basically completed. When sending the last several information frames, the master node may send a fifth information frame to the slave node. The fifth information frame includes a training information frame, and the training information frame includes a first count of remaining training information frames. Assuming that the master node sends the reverse training information frame, the first count of remaining training information frames is a count of remaining reverse training information frames. The slave node receives the fifth information frame, and then determines a second count of remaining training information frames based on the first count of remaining training information frames in the fifth information frame. Generally, a value of the second count of remaining training information frames is equal to a value of the first count of remaining training information frames, indicating that a quantity of remaining to-be-sent reverse training information frames is the same as a quantity of remaining to-be-sent forward training information frames. Finally, the slave node sends a sixth information frame to the master node. A training information frame in the sixth information frame includes the second count of remaining training information frames. Each time the master node and the slave node exchange the fifth information frame and the sixth information frame, count values of the remaining reverse training information frames and forward training information frames indicated by the first count of remaining training information frames and the second count of remaining training information frames are decreased by 1. Alternatively, when sending duration of the fifth information frame is different from sending duration of the sixth information frame, to set a quantity of remaining training information frames of the fifth information frame and a quantity of remaining training information frames of the sixth information frame to be equal, a quantity of remaining training information frames of the forward training information frame may be set to a quantity of to-be-sent groups of remaining forward training frames, and a quantity of forward training information frames included in each group is a quantity of forward training information frames that can be sent within duration of sending one reverse training frame. After the forward training information frame of the last serial number in each group is sent, the count of remaining forward training frames is decreased by 1. Until the count of remaining reverse training information frames and the count of remaining forward training information frames are 0, sending the fifth information frame and the sixth information frame stops.

Optionally, the method further includes: When a quantity of remaining information frames is a first preset value, the master node sends a seventh information frame to the slave node. The seventh information frame includes a first ending identifier that is used to demarcate a boundary at which the master node jumps to the training verification state. The master node receives an eighth information frame that carries a second ending identifier.

The first preset threshold may be used to indicate that a quantity of remaining to-be-sent training information frames is 0, indicating that the currently-sent training information frame is the last training information frame. In this case, the seventh information frame sent by the master node to the slave node includes the first preset value, and last several bits of the seventh information frame are the first ending identifier. After receiving the seventh information frame, the slave node may determine, based on the first ending identifier, that the master node has completed sending of the information frame. Similarly, an eighth information frame sent by the slave node to the master node includes the first preset value, and last several bits of the eighth information frame are the second ending identifier. After receiving the eighth information frame, the master node determines, based on the second ending identifier, that the slave node has completed sending of the information frame. The first ending identifier and the second ending identifier may occupy a same bit length, or may occupy different bit lengths. When the first ending identifier and the second ending identifier occupy a same bit length, the first ending identifier and the second ending identifier may be same codes, or may be different codes. This is not limited in this application.

Optionally, that the slave node is further configured to generate the fourth information frame specifically includes: The slave node determines a length of the fourth information frame based on a length of the third information frame. When the first training information frame is a reverse training information frame and the second training information frame is a forward training information frame, the length of the third information frame is an integer multiple of the length of the fourth information frame, or when the first training information frame is a forward training information frame and the second training information frame is a reverse training information frame, the length of the fourth information frame is an integer multiple of the length of the third information frame, where the length is a time length or a bit length. The slave node generates the fourth information frame based on the length of the fourth information frame.

As mentioned in the foregoing description, the forward training information frame is a frame sent at a high speed, and the reverse training information frame is a frame sent at a low speed. Correspondingly, the reverse information frame used to indicate the reverse training information frame is also a frame sent at a low speed, and the forward information frame used to indicate the forward training information frame is a frame sent at a high speed. Optionally, for parameter settings when the reverse information frame and the forward information frame are sent, refer to Table 3.

TABLE 3

| Parameter setting table of sending an information frame | | | |
|---|---|---|---|
| Rate gear | Gear 1 | Gear 2 | Gear 3 |
| Forward rate (megabits per second (Mbps)) | 4000 | 8000 | 12750 |
| Reverse rate (Mbps) | 200 | 200 | 200 |
| Forward modulation mode | PAM2 | PAM2 | PAM4 |
| Baud rate for sending a forward information frame (MBaud) | 4000 | 8000 | 6375 |
| Baud rate for sending a reverse information frame (MBaud) | 200 | 200 | 200 |
| Forward information frame duration (µs) | 2 | 2 | 2 |
| Reverse information frame duration (µs) | 16 | 16 | 16 |
| Forward information frame length N1 (bit) | 8000 | 16000 | 12750 |
| Reverse information frame length N2 (bit) | 3200 | 3200 | 3200 |
| Information frame duration ratio (forward: reverse) | 1:8 | 1:8 | 1:8 |
| Forward ending identifier duration (µs) | 1 | 1 | 1 |

TABLE 3-continued

| Parameter setting table of sending an information frame | | | |
| --- | --- | --- | --- |
| Rate gear | Gear 1 | Gear 2 | Gear 3 |
| Reverse ending identifier duration (μs) | 1 | 1 | 1 |
| Forward ending identifier bit (bit) | 4000 | 8000 | 6375 |
| Reverse ending identifier bit (bit) | 200 | 200 | 200 |

It can be learned from Table 3 that, at the gear 1 and the gear 2, the baud rate for sending the forward information frame is 20 times the baud rate for sending the reverse information frame, and at the gear 3, the forward rate is 31.875 times the reverse rate, that is, the forward rate is far greater than the reverse rate. Therefore, when the lengths of the reverse information frame and the forward information frame are set, the bit lengths of the reverse information frame and the forward information frame may be set based information frame). In this case, the node can receive and send information frames at the same time, and can enable a next state without extra waiting time. This effectively improves signal transmission efficiency.

Alternatively, optionally, the reverse information frame and the forward information frame may be set to have an equal bit length. For specific parameter settings, refer to Table 4.

TABLE 4

Figure 3H:
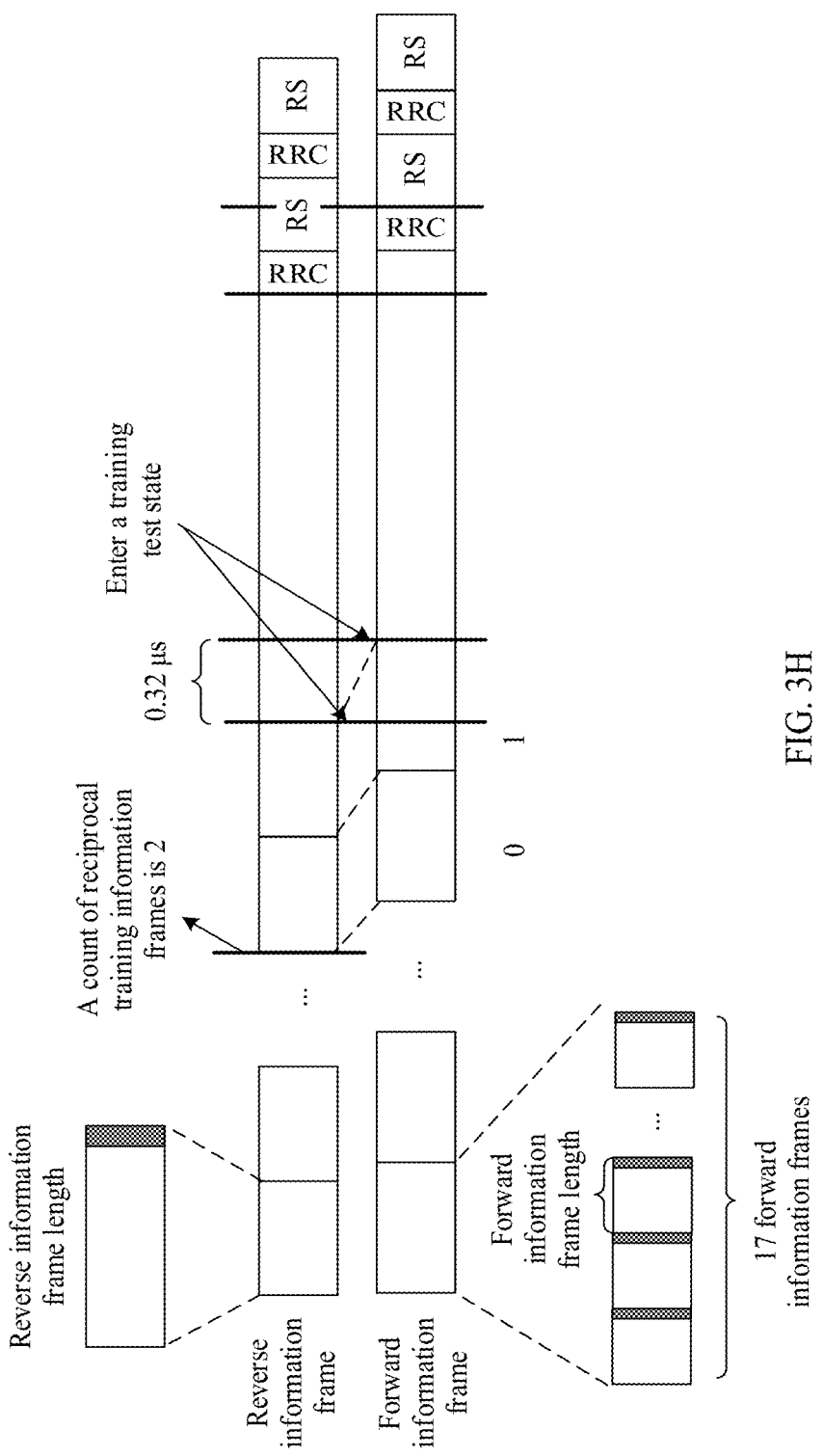
FIG. 3H is a schematic diagram of another information frame transmission according to an embodiment of this application.

| Parameter setting table of sending an information frame | | | |
| --- | --- | --- | --- |
| Parameter | Gear 1 | Gear 2 | Gear 3 |
| Forward rate (Mbps) | 4000 | 8000 | 12750 |
| Reverse rate (Mbps) | 200 | 200 | 200 |
| Forward baud rate (S1) (Mbaud) | 4000 | 8000 | 6375 |
| Reverse baud rate (S2) (Mbaud) | 200 | 200 | 200 |
| Forward baud rate:reverse baud rate | 20 | 40 | 31.875 |
| Forward information frame length value (M1) (bit) | 4096 | 4096 | 4096 |
| Reverse information frame length value (N1) (bit) | 4096 | 4096 | 4096 |
| Forward information frame duration value (μs) | 1.024 | 0.512 | 0.643 |
| Reverse information frame duration value (μs) | 20.48 | 20.48 | 20.48 |
| Total quantity of reverse information frames (N2) | 100 | 100 | 100 |
| Reverse training duration (μs) | 2048 | 2048 | 2048 |
| Total quantity of forward information frames | 2000 | 4000 | 3188 |
| Forward training duration (μs) | 2048 | 2048 | 2048.32 |
| Additional transmission duration of forward information frames compared with reverse information frames (μs) | 0 | 0 | 0.32 | on that the transmission duration of the reverse information frame is an integer multiple of the transmission duration of the forward information frame. The integer multiple may be determined based on a ratio of baud rates of forward and reverse transmission. For example, the bit lengths of the reverse information frame and the forward information frame are set based on transmission duration 8:1. The duration of the forward information frame is 2 microseconds (s), and is 8000 bits corresponding to the gear 1, 16000 bits corresponding to the gear 2, and 12750 bits corresponding to the gear 3. The duration of the reverse information frame is 16 s, and is 3200 bits corresponding to the gear 1, the gear 2 and the gear 3. For a specific information frame transmission process, refer to FIG. 3F. FIG. 3F is a schematic diagram of information frame transmission according to an embodiment of this application. As shown in FIG. 3F, some bits in each forward information frame are used to indicate a forward training information frame, and some bits in each reverse information frame are used to indicate a reverse training information frame. When the reverse information frame and the forward information frame are set based on the parameters in Table 3, eight forward information frames can be transmitted when one reverse information frame is transmitted. Time at which a node sends eight forward information frames is aligned with time at which the node receives one forward information frame (or time at which the node receives eight forward information frames is aligned with time at which the node sends one forward According to Table 4, ratios of the forward baud rate to the reverse baud rate at the gear 1, gear 2, and gear 3 are 20, 40, and 31.875 respectively. If bit lengths of the forward information frame and the reverse information frame are set to be the same, for example, 4096 bits, a total quantity of to-be-sent reverse information frames is set to 100, and a total quantity of to-be-sent forward information frames is set to 2000 at the gear 1. In this case, a total length of to-be-sent reverse information frames is 100*4096, duration that needs for sending is 100*4096/200=2048 s, a total length of the forward information frame that needs to be sent is 2000*4096, and duration that needs for sending is 2000*4096/4000=2048 as. In this case, a difference between the transmission duration of the forward information frame and the transmission duration of the reverse information frame is 0 μs. The calculation methods for the gear 2 and the gear 3 are the same. The obtained transmission duration differences are 0 μs and 0.32 μs respectively. For a specific transmission process, refer to FIG. 3H. FIG. 3H is a schematic diagram of another information frame transmission according to an embodiment of this application. As shown in FIG. 3H, when a reverse information frame and a forward information frame are set based on parameters in Table 4, at the gear 1, it takes 20.48 μs to complete transmission of one reverse information frame and 1.024 μs to complete transmission of one forward information frame, and a time difference between transmission of 100 reverse information frames and transmission of 2000 forward information frames is 0 μs. At the gear 3, a maximum time difference between the completion of 100 reverse information frames and the completion of 3188 forward information frames is 0.32 μs. This value is a minimum value, and can ensure that a difference between forward and reverse information transmission is within a length range of one RS code block+an reverse retransmission control (RRC) during information transmission after link training is completed between nodes. The foregoing transmission time difference meets the requirement.

After the link training between the master node and the slave node is completed, a training verification process may be performed. To further ensure that a difference between forward and reverse information transmission falls within a length range of one RS code block+RRC, lengths of the forward training verification frame and the reverse training verification frame may be set. For details, refer to Table 5.

TABLE 5

Parameter setting table of sending a training verification frame

| Rate gear | Gear 1 | Gear 2 | Gear 3 |
|---|---|---|---|
| Forward rate (Mbps) | 4000 | 8000 | 12750 |
| Reverse rate (Mbps) | 200 | 200 | 200 |
| Forward transmission baud rate (Mbaud) | 4000 | 8000 | 6375 |
| Reverse transmission baud rate (Mbaud) | 200 | 200 | 200 |
| Forward RS forward error correction (FEC) block size (bit) | 4000 | 4000 | 4000 |
| Reverse RS FEC block size (bit) | 1000 | 1000 | 1000 |
| Quantity of forward training verification frames | 100 | 200 | 319 |
| Quantity of reverse training verification frames | 20 | 20 | 20 |
| Forward training verification frame duration (μs) | 100.00 | 100.00 | 100.08 |
| Reverse training verification frame duration (μs) | 100.00 | 100.00 | 100.00 |

The gear 1 is used as an example for description. A ratio of the forward transmission baud rate to the reverse transmission baud rate is 20:1. The forward training verification frame is sent by using a forward RS FEC block. Each forward RS FEC block is 4000 bits. 100 forward training verification frames are sent, that is, 100 forward RS FEC blocks are sent, and is in total of 4000*100 bits. The duration 100 μs of the forward training verification frame may be obtained through calculation based on the transmission baud rate 4000. Similarly, the total size of the reverse RS FEC block is 1000*20 bits, and the duration 100 μs of the reverse training verification frame may be obtained through calculation based on the transmission baud rate 200. In this case, in a training verification phase, the master node and the slave node send training verification frames of same duration, which does not affect a difference between forward and reverse information transmission.

In this embodiment of this application, the forward information frame and the reverse information frame are set to a same bit length based on a feature of different transmission baud rates of the reverse information frame and the forward information frame, and a total quantity of sent forward information frames and reverse information frames is set based on a baud rate multiple relationship between the forward information frame and the reverse information frame. This can ensure that a transmission time difference between the forward information frame and the reverse information frame is within a preset range, and avoid impact of an excessively large transmission time difference on a subsequent information transmission process.

It should be noted that the forward training frame may be sent by the master node, or may be sent by the slave node. Assuming that the first training information frame is a reverse training information frame and the second training information frame is a forward training information frame, the third information frame is a reverse information frame and the fourth information frame is a forward information frame. Assuming that the first training information frame is a forward training information frame and the second training information frame is a reverse training information frame, the third information frame is a forward information frame and the fourth information frame is a reverse information frame. Settings of the lengths of the third information frame and the fourth information frame correspond to the settings of the forward information frame or the reverse information frame.

Figure 3I:
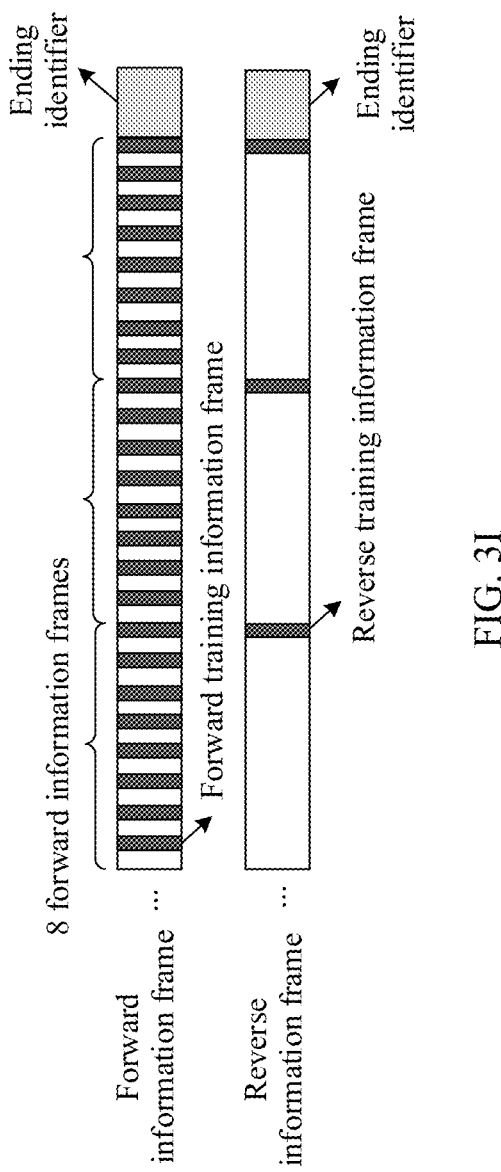
FIG. 3I is a schematic diagram of setting an ending identifier according to an embodiment of this application.

As described above, an ending identifier may be added to the last reverse information frame and the forward information frame, to mark that sending of the information frame ends. Corresponding to the parameters in Table 3, the ending identifier duration may be set to 1 μs. In this case, when the gear 1 is used, a corresponding ending identifier in the forward information frame is 4000 bits, and an ending identifier in the reverse information frame is 200 bits. For details, refer to FIG. 3I. FIG. 3I is a schematic diagram of setting an ending identifier. When the gear 2 is used, the ending identifier in the forward information frame is 8000 bits, and the ending identifier in the reverse information frame is 200 bits. When the gear 3 is used, the ending identifier in the forward information frame is 6375 bits, and the ending identifier in the reverse information frame is 200 bits. As shown in FIG. 3I, after ending identifiers with same duration are added to the forward information frame and the reverse information frame, time for completing transmission of the forward information frame and the reverse information frame is still the same, and subsequent data or control information transmission is not affected. Alternatively, the reverse information frame and the forward information may be another ending identifier of same duration, for example, 0.5 μs, 0.1 μs, or 2 μs. This is not limited in this embodiment of this application.

Similarly, an ending identifier of same duration may also be added to the reverse information frame and the forward information frame obtained by setting corresponding parameters in Table 4, so that after the ending identifier is added, the transmission duration difference between the reverse information frame and the forward information frame is not affected. Alternatively, ending identifiers of different duration may be set in the reverse information frame and the forward information frame, to supplement a transmission duration difference between the reverse information frame and the forward information frame. For example, the transmission duration of the forward information frame obtained by setting parameters in Table 4 is 0.32 μs longer than the transmission duration of the reverse information frame. The ending identifier duration in the forward training frame may be set to T1. In this case, the ending identifier duration in the reverse training frame is T2=T1+0.32, and a unit of the duration T1 and T2 is μs. After the ending identifier is added to the last forward information frame and the reverse information frame, time for completing transmission of the two frames is the same. This further avoids impact on subsequent data or control information transmission.

Figure 4A:
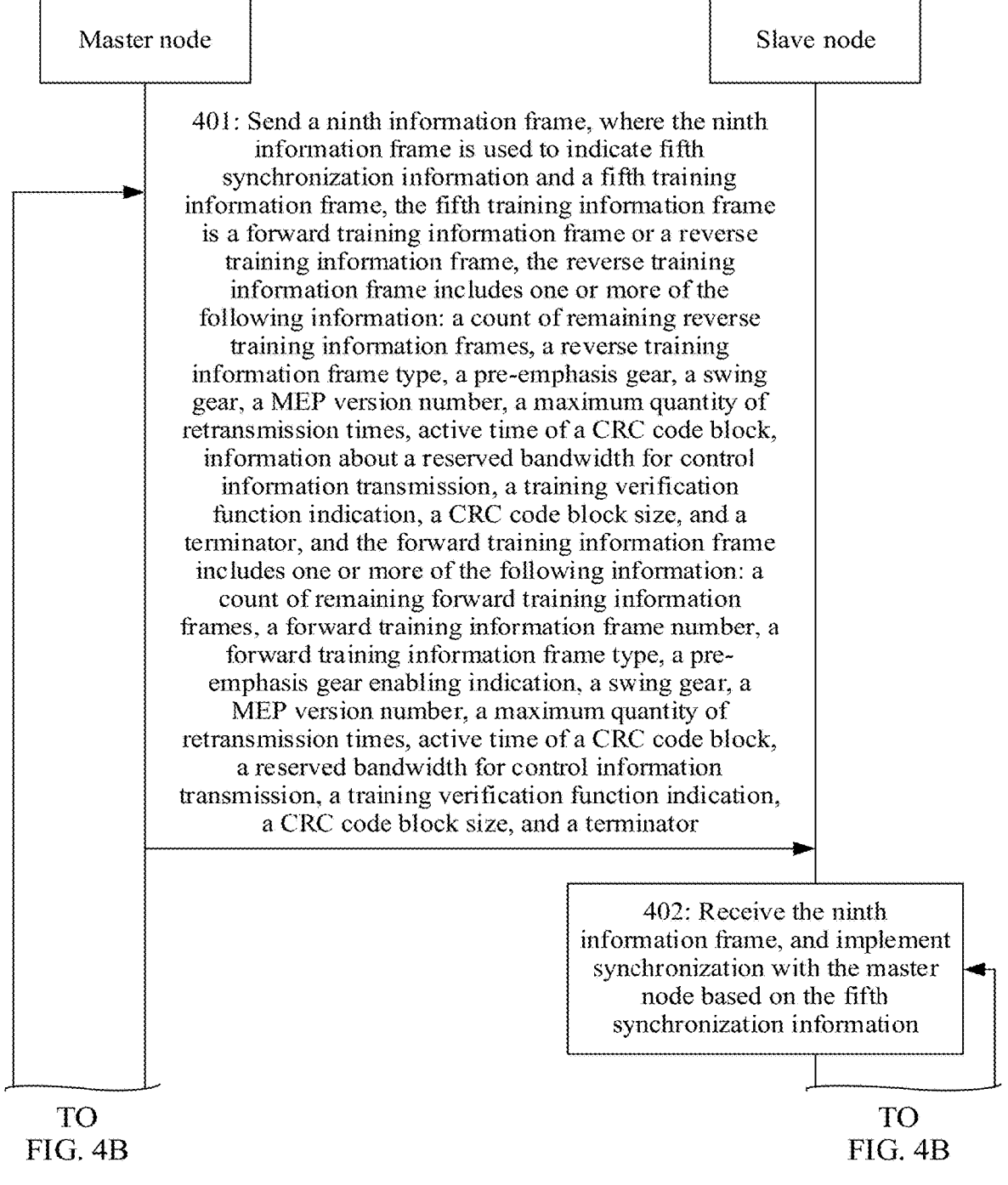

FIG. 4A and FIG. 4B are a flowchart of another communication link initialization method according to an embodiment of this application. As shown in FIG. 4A and FIG. 4B, the method includes the following steps:

401: A master node sends a ninth information frame to a slave node, where the ninth information frame is used to indicate fifth synchronization information and a fifth training information frame, the fifth training information frame is a forward training information frame or a reverse training information frame, the reverse training information frame includes one or more of the following information: a count of remaining reverse training information frames, a reverse training information frame type, a pre-emphasis gear, a swing gear, a MEP version number, a maximum quantity of retransmission times, a transparent transmission mode indication, active time of a CRC code block, information about a reserved bandwidth for control information transmission, a training verification function indication, a CRC code block size, and a terminator, and the forward training information frame includes one or more of the following information: a count of remaining forward training information frames, a forward training information frame number, a forward training information frame type, a pre-emphasis gear enabling indication, a swing gear, a MEP version number, a maximum quantity of retransmission times, a transparent transmission mode indication, active time of a CRC code block, a reserved bandwidth for control information transmission, a training verification function indication, a CRC code block size, and a terminator.

402: The slave node receives the ninth information frame from the master node, and implements synchronization with the master node based on the fifth synchronization information.

403: The slave node sends a tenth information frame to the master node, where the tenth information frame is used to indicate sixth synchronization information and a sixth training information frame, and the sixth training information frame is reverse training information or forward training information.

404: The slave node trains a link between the master node and the slave node based on the ninth information frame.

405: The master node receives the tenth information frame from the slave node, and implements synchronization with the slave node based on the sixth synchronization information.

406: The master node trains the link between the master node and the slave node based on the tenth information frame.

In this embodiment of this application, the ninth information frame sent by the master node to the slave node indicates both the fifth synchronization information and the fifth training information frame. The slave node obtains the fifth synchronization information and the fifth training information frame from the ninth information frame, then performs synchronization with the slave node based on the fifth synchronization information, and then performs link training with the slave node based on information in the fifth training information frame. Assuming that transmission from the master node to the slave node is reverse transmission, the ninth information frame is a reverse information frame, and the fifth training information frame is a reverse training information frame. Particularly, information in the reverse training information frame may include one or more of the following information: the count of remaining reverse training information frames, the reverse training information frame type, the pre-emphasis gear, the swing gear, the MEP version number, the maximum quantity of retransmission times, the transparent transmission mode indication, the active time of the CRC code block, the information about the reserved bandwidth for control information transmission, the training verification function indication, the CRC code block size, and the terminator. Connotations indicated by the information are the same as connotations indicated by corresponding information in the embodiments corresponding to FIG. 3A to FIG. 3I. Similarly, information included in the reverse training information frame may further include precoding codebook selection, an interleaving depth, an RS code block size, a CRC check bit, and the like. This is not limited in this embodiment of this application.

Assuming that transmission from the master node to the slave node is forward transmission, the ninth information frame is a forward information frame, and the fifth training information frame is a forward training information frame. Particularly, information in the forward training information frame may include one or more of the following information: the count of remaining forward training information frames, the forward training information frame number, the forward training information frame type, the pre-emphasis gear enabling indication, the swing gear, the MEP version number, the maximum quantity of retransmission times, the transparent transmission mode indication, the active time of the CRC code block, the reserved bandwidth for control information transmission, the training verification function indication, the CRC code block size, and the terminator. Connotations indicated by the information are the same as connotations indicated by corresponding information in the embodiments corresponding to FIG. 3A to FIG. 3I. Similarly, information included in the forward training information frame may further include: a local receiving state indication, a sleep function indication, a retransmission enable identifier of a first end, a CRC check bit, and the like. The CRC check bit may be used to check information starting from remaining reverse training information frame information in Table 1 to information preceding the CRC check bit. This is not specifically limited in this embodiment of this application.

The tenth information frame sent by the slave node to the master node indicates both the sixth synchronization information and the sixth training information frame. The master node obtains the sixth synchronization information and the sixth training information frame from the tenth information frame, then performs synchronization with the slave node based on the sixth synchronization information, and then performs link training with the master node based on information in the sixth training information frame. Assuming that transmission from the master node to the slave node is reverse transmission, transmission from the slave node to the master node is forward transmission, the tenth information frame is a forward information frame, and the sixth training information frame is a forward training information frame. Assuming that transmission from the master node to the slave node is forward transmission, transmission from the slave node to the master node is reverse transmission, the tenth information frame is a reverse information frame, and the sixth training information frame is a reverse training information frame. Information that may be included in the reverse training information frame and the forward training information frame has been described in the foregoing content. Details are not described herein again.

It can be learned that in this embodiment of this application, content of the training information frame is added or modified, so that nodes can perform more fully capability negotiation, state control, and parameter exchange when performing link training between nodes by using information in the training information frame, a training result achieved in a link training process can meet requirements of more scenarios, and reliability of the link training result is improved.

Optional, parameter settings when the ninth information frame and the tenth information frame are sent are determined based on whether attributes of the two frames are forward information frames or reverse information frames. For details, refer to the parameter settings and descriptions of the corresponding information frames in Table 3 or Table 4. Details are not described herein again.

In addition, in a case in which a quantity of remaining training information frames in the ninth information frame and the tenth information frame is 1, that is, when the last training information frame is sent, a sending ending identifier may be carried to mark that sending of the reverse training frame or the forward training frame is completed. For a setting of a length of the ending identifier, refer to specific descriptions of embodiments corresponding to FIG. 3A to FIG. 3I. Details are not described herein again.

Optionally, for a length relationship between the ninth information frame and the fifth training information frame and the fifth synchronization information that are indicated in the ninth information frame, a length relationship between the tenth information frame and the sixth training information frame and the sixth synchronization information that are indicated in the tenth information frame, and a process such as setting a length of a training verification frame after the ninth training frame and the tenth training frame, refer to specific descriptions in FIG. 3A to FIG. 3I. Details are not described herein again.

Figure 5A:
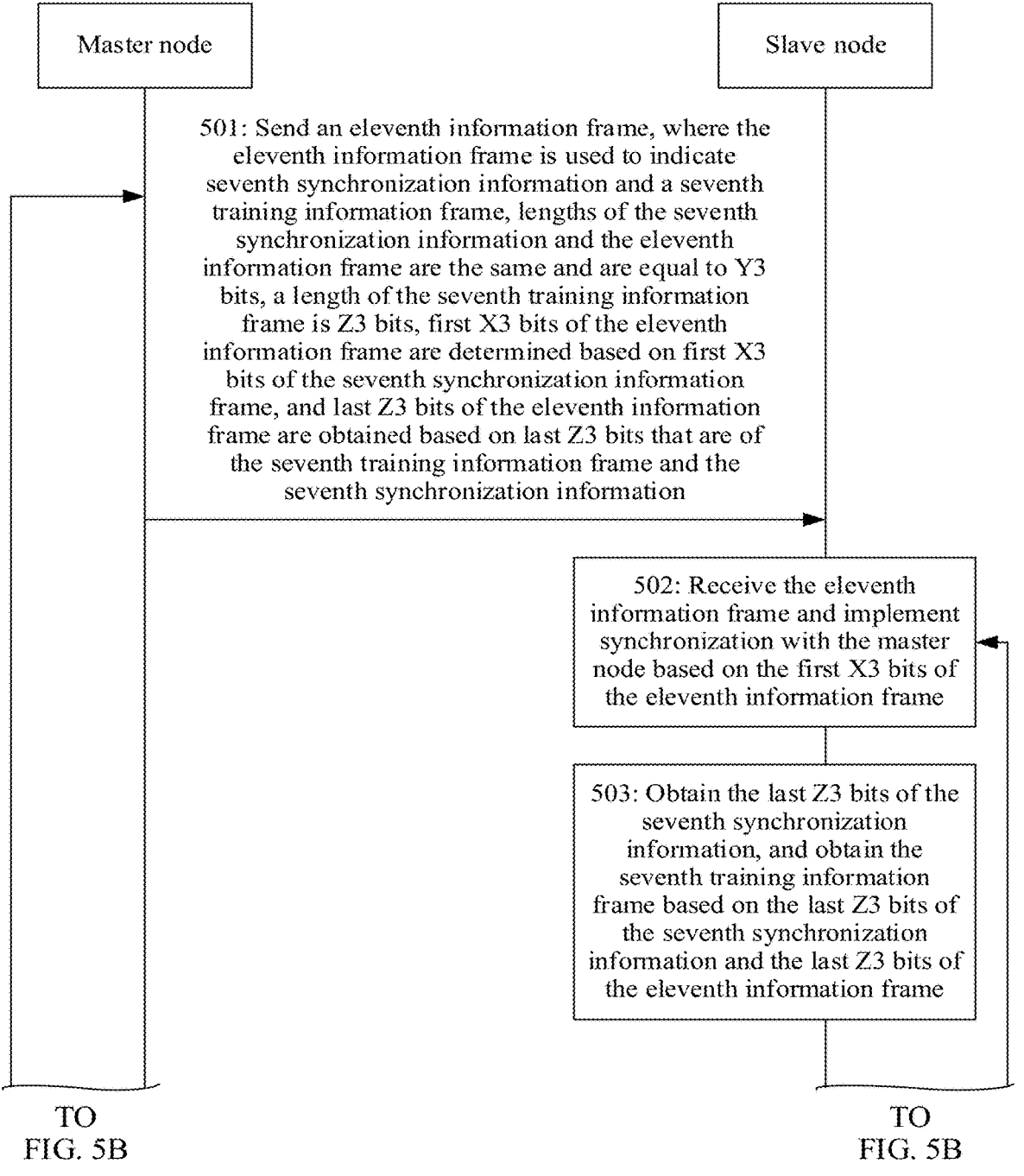

FIG. 5A and FIG. 5B are a flowchart of another communication link initialization method according to an embodiment of this application. As shown in FIG. 5A and FIG. 5B, the method includes the following steps:

501: A master node sends an eleventh information frame to a slave node, where the eleventh information frame is used to indicate seventh synchronization information and a seventh training information frame, lengths of the seventh synchronization information and the eleventh information frame are the same and are equal to $Y3$ bits, a length of the seventh training information frame is $Z3$ bits, first $X3$ bits of the eleventh information frame are determined based on first $X3$ bits of the seventh synchronization information, and last $Z3$ bits of the eleventh information frame are obtained based on the seventh training information frame and last $Z3$ bits of the seventh synchronization information, where $X3$, $Y3$, and $Z3$ are positive integers, and $X3+Z3=Y3$.

502: The slave node receives the eleventh information frame from the master node, and implements synchronization with the master node based on the first $X3$ bits of the eleventh information frame, where the first $X3$ bits of the eleventh information frame are the same as the first $X3$ bits of seventh synchronization information.

503: The slave node obtains the last $Z3$ bits of the seventh synchronization information, and obtains the seventh training information frame based on the last $Z3$ bits of the seventh synchronization information and the last $Z3$ bits of the eleventh information frame, where lengths of the eleventh information frame and the seventh synchronization information are the same and are $Y3$ bits, $X3$, $Y3$, and $Z3$ are positive integers, and $X3+Z3=Y3$.

504: The slave node sends a twelfth information frame to the master node, where the twelfth information frame is used to indicate eighth synchronization information and an eighth training information frame, lengths of the eighth synchronization information and the twelfth information frame are the same and are equal to $Y4$ bits, a length of the eighth training information frame is $Z4$ bits, first $X4$ bits of the twelfth information frame are determined based on first $X4$ bits of the eighth synchronization information, and last $Z4$ bits of the twelfth information frame are obtained based on the eighth training information frame and last $Z4$ bits of the eighth synchronization information, where $X4$, $Y4$, and $Z4$ are positive integers, and $X4+Z4=Y4$.

505: The slave node trains a link between the slave node and the master node based on the seventh synchronization information and the seventh training information frame.

506: The master node receives the twelfth information frame from the slave node, and implements synchronization with the slave node based on the first $X4$ bits of the twelfth information frame, where the first $X4$ bits of the twelfth information frame are the same as the first $X4$ bits of the eighth synchronization information.

507: The master node obtains the last $Z4$ bits of the eighth synchronization information, and obtains the eighth training information frame based on the last $Z4$ bits of the eighth synchronization information and the last $Z4$ bits of the twelfth information frame, where lengths of the twelfth information frame and the eighth synchronization information are the same and are $Y4$ bits, $X4$, $Y4$, and $Z4$ are positive integers, and $X4+Z4=Y4$.

508: The master node trains the link between the master node and the slave node based on the eighth synchronization information and the eighth training information frame.

The master node sends the eleventh information frame to the slave node. The eleventh information frame is used to indicate the seventh synchronization information and the seventh training information frame, the first $X3$ bits of the seventh synchronization information is directly added to the eleventh information frame, the last $Z3$ bits of the seventh synchronization information and $Z3$ bits of the seventh training information frame are combined to obtain the last $Z3$ bits of the eleventh information frame, and a total length of the eleventh information frame is $Y3=X3+Z3$, that is, information in the eleventh information frame includes only the seventh synchronization information and the indicated seventh training information frame, but does not include other additionally-added partition information or block information. The slave node may complete synchronization with the master node based on the first $X3$ bits of the eleventh information frame, that is, the first $X3$ bits of the seventh synchronization information, further obtain the last $Z3$ bits of the seventh synchronization information according to a local scrambler generation rule (or the last $Z3$ bits of the seventh synchronization information may be a known fixed sequence), and finally obtain the seventh training information frame by demodulating the last $Z3$ bits of the seventh information frame based on the last $Z3$ bits of the seventh synchronization information. Further, link training with the slave node is performed based on the seventh synchronization information and the seventh training information frame.

Similarly, the twelfth information frame sent by the slave node to the master node is used to indicate both the eighth synchronization information and the eighth training information frame, the first $X4$ bits of the eighth synchronization information is directly added to the twelfth information frame, the last $Z4$ bits of the eighth synchronization information and the $Z4$ bits of the eighth training information frame are combined to obtain the last $Z4$ bits of the twelfth information frame, and a total length of the twelfth information frame is $Y4=X4+Z4$, that is, information in the twelfth information frame includes only the eighth synchronization information and the indicated eighth training information frame, but does not include other additionally-added partition information or block information. After receiving the twelfth information frame, the master node performs synchronization with the slave node in the same manner, and obtains the eighth training information frame through demodulation. Further, link training with the slave node is performed based on the eighth synchronization information and the eighth training information frame.

It can be learned that in this embodiment of this application, an information frame includes synchronization information and a bit that indicates a training information frame, and does not include additionally-added partition information or block information bits. In this way, when synchronization is implemented, a register can directly complete synchronization based on the synchronization information. This avoids a problem that synchronization cannot be implemented because an additional-added bit cannot be identified, and improves efficiency and reliability of node synchronization.

Parameter settings when the eleventh information frame and the twelfth information frame are sent are determined based on whether the two frames are forward information frames or reverse information frames. For a specific process, refer to parameter settings and descriptions of corresponding information frames in Table 3 or Table 4. Correspondingly, the seventh training information frame and the eighth training information frame in the eleventh information frame and the twelfth information frame may be forward training information frames or reverse training information frames. For information carried therein, refer to FIG. 3A to FIG. 3I or corresponding descriptions in FIG. 4A and FIG. 4B. In addition, when the last eleventh information frame and the last twelfth information frame are sent, an ending identifier may also be carried. For a setting of a length of the ending identifier, refer to specific descriptions of embodiments corresponding to FIG. 3A to FIG. 3I. Details are not described herein again. Optionally, for a length relationship between the eleventh information frame and the seventh training information frame and the seventh synchronization information that are indicated in the eleventh information frame, a length relationship between the twelfth information frame and the eighth training information frame and the eighth synchronization information that are indicated in the twelfth information frame, and a process such as setting a length of a training verification frame after the eleventh training frame and the twelfth training frame, refer to specific descriptions in FIG. 3A to FIG. 3I. Details are not described herein again.

Figure 6:
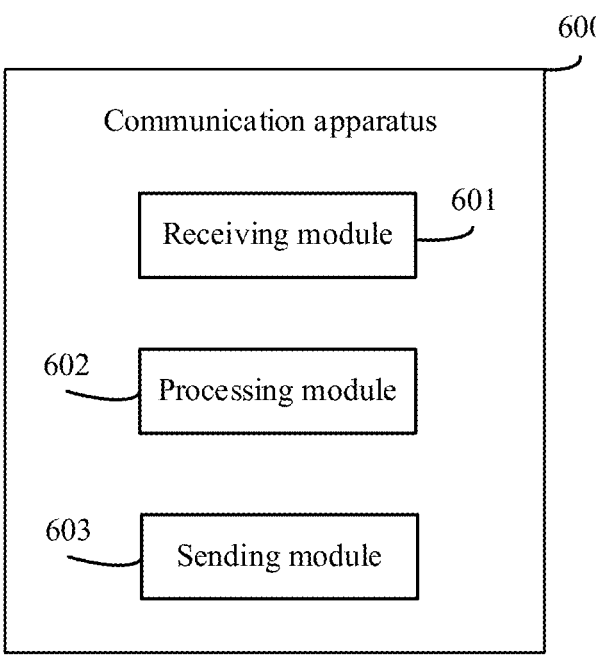
FIG. 6 is a structural block diagram of a communication apparatus according to an embodiment of this application.

FIG. 6 shows a communication apparatus 600 according to an embodiment of this application. The communication apparatus 600 may be configured to perform the communication link initialization method applied to the master node in FIG. 3A to FIG. 3I and specific embodiments. The communication apparatus includes a receiving module 601, a processing module 602, and a sending module 603.

The sending module 603 is configured to send a first information frame to a slave node, where the first information frame includes first synchronization information.

The receiving module 601 is configured to receive a second information frame from the slave node, where the second information frame includes second synchronization information.

The processing module 602 is configured to implement synchronization with the slave node based on the second synchronization information.

The sending module 603 is further configured to send a third information frame to the slave node, where the third information frame is used to indicate a first training information frame.

The receiving module 601 is further configured to receive a fourth information frame from the slave node, where the fourth information frame is used to indicate a second training information frame.

The processing module 602 is further configured to train a link between a master node and the slave node based on the fourth information frame.

Optionally, the third information frame is further used to indicate third synchronization information, lengths of the third information frame and the third synchronization information are the same and are equal to Y1 bits, a length of the first training information frame is Z1 bits, first X1 bits of the third information frame are determined based on first X1 bits of the third synchronization information, and last Z1 bits of the third information frame are obtained based on the first training information frame and last Z1 bits of the third synchronization information, where X1, Y1, and Z1 are positive integers, and X1+Z1=Y1.

Optionally, the first training information frame is a forward training information frame, and the second training information frame is a reverse training information frame; or the first training information frame is a reverse training information frame, and the second training information frame is a forward training information frame.

Optionally, the reverse training information frame includes one or more of the following information: a count of remaining reverse training information frames used to indicate a quantity of remaining to-be-sent reverse training information frames; a reverse training information frame type used to identify a type of the reverse training information frame; a pre-emphasis gear used to configure a pre-emphasis level of a second end, where the second end is a node that sends the forward training information frame; a swing gear used to configure a transmit swing of the second end; a MEP version number used to indicate a MEP version number supported by a first end, where the first end is a node that sends the reverse training information frame; a maximum quantity of retransmission times used to configure a maximum quantity of retransmission times of information transmission of the second end; a transparent transmission mode indication used to indicate the first end whether to enable a transparent transmission mode; active time of a CRC code block used to identify active time of a correspondingly-transmitted CRC code block in an information transmission process of the first end that sends the reverse training information frame; a reserved bandwidth for control information transmission used to configure a bandwidth proportion occupied by control information transmission in the information transmission process of the second end; a training verification function indication used to indicate that the first end can jump from a training state to a training verification state, where the training state is a state in which the master node and the slave node perform link training, and the training verification state is a state in which the master node and the slave node verify a result of the link training; a CRC code block size used to identify a size of a CRC code block correspondingly transmitted in the information transmission process of the first end; and a terminator used to identify a termination of the reverse training information frame.

Optionally, the forward training information frame includes one or more of a count of remaining forward training information frames used to identify a quantity of remaining to-be-sent forward training information frames; a forward training information frame number used to identify a number of the forward training information frame; a forward training information frame type used to identify a type of the forward training information frame; a pre-emphasis gear enabling indication used to identify a pre-emphasis gear used by the second end; a swing gear used to configure a transmit swing of the first end; a MEP version number used to indicate a MEP version number supported by the second end; a maximum quantity of retransmission times used to configure a maximum quantity of retransmission times of information transmission of the first end; a transparent transmission mode indication used to indicate the second end whether to enable the transparent transmission mode; active time of a CRC code block used to identify active time of a correspondingly-transmitted CRC code block in the information transmission process of the second end; a reserved bandwidth for control information transmission used to configure a bandwidth proportion occupied by control information transmission in the information transmission process of the first end; a training verification function indication used to indicate whether the second end jumps from the training state to the training verification state; a CRC code block size used to identify a size of a CRC code block correspondingly transmitted in the information transmission process of the second end; and a terminator used to identify a termination of the forward training information frame.

Optionally, the sending module 603 is further configured to send, to the slave node, a fifth information frame that indicates a first count of remaining training information frames. The receiving module 601 is further configured to receive, from the slave node, a sixth information frame that indicates a second count of remaining training information frames.

Optionally, when a count of reciprocal information frames is a first preset value, the sending module 603 is further configured to send a seventh information frame to the slave node. The seventh information frame includes a first ending identifier that is used to demarcate a boundary at which the master node jumps to the training verification state. The receiving module 601 is further configured to receive an eighth information frame that carries a second ending identifier.

Alternatively, the communication apparatus 600 may be configured to perform the communication link initialization method applied to the master node in FIG. 4A and FIG. 4B and specific embodiments.

The sending module 603 is configured to send a ninth information frame to the slave node. The ninth information frame is used to indicate fifth synchronization information and a fifth training information frame, the fifth training information frame is a forward training information frame or a reverse training information frame, the reverse training information frame includes one or more of the following information: a count of remaining reverse training information frames, a reverse training information frame type, a pre-emphasis gear, a swing gear, a MEP version number, a maximum quantity of retransmission times, a transparent transmission mode indication, active time of a CRC code block, information about a reserved bandwidth for control information transmission, a training verification function indication, a CRC code block size, and a terminator, and the forward training information frame includes one or more of the following information: a count of remaining forward training information frames, a forward training information frame number, a forward training information frame type, a pre-emphasis gear enabling indication, a swing gear, a MEP version number, a maximum quantity of retransmission times, a transparent transmission mode indication, active time of a CRC code block, a reserved bandwidth for control information transmission, a training verification function indication, a CRC code block size, and a terminator.

The receiving module 601 is configured to receive a tenth information frame from the slave node. The tenth information frame is used to indicate sixth synchronization information and a sixth training information frame, and the sixth training information frame is a reverse training information frame or a forward training information frame.

The processing module 602 is configured to implement synchronization with the slave node based on the sixth synchronization information.

The processing module 602 is further configured to train the link between the master node and the slave node based on the tenth information frame.

Alternatively, the communication apparatus 600 may be further configured to perform the communication link initialization method applied to the master node in FIG. 5A and FIG. 5B and specific embodiments.

The sending module 603 is configured to send an eleventh information frame to the slave node. The eleventh information frame is used to indicate seventh synchronization information and a seventh training information frame, lengths of the seventh synchronization information and the eleventh information frame are the same and are equal to Y3 bits, a length of the seventh training information frame is Z3 bits, first X3 bits of the eleventh information frame are determined based on first X3 bits of the seventh synchronization information, and last Z3 bits of the eleventh information frame are obtained based on the seventh training information frame and last Z3 bits of the seventh synchronization information, where X3, Y3, and Z3 are positive integers, and X3+Z3=Y3.

The receiving module 601 is configured to receive a twelfth information frame from the slave node, and implement synchronization with the slave node based on first X4 bits of the twelfth information frame, where the first X4 bits of the twelfth information frame are the same as first X4 bits of the eighth synchronization information.

The processing module 602 is configured to obtain last Z4 bits of the eighth synchronization information, and obtain an eighth training information frame based on the last Z4 bits of the eighth synchronization information and last Z4 bits of the twelfth information frame, where lengths of the twelfth information frame and the eighth synchronization information are the same and are Y4 bits, X4, Y4, and Z4 are positive integers, and X4+Z4=Y4.

The processing module 602 is further configured to train the link between the master node and the slave node based on the eighth synchronization information and the eighth training information frame.

Optionally, the processing module 602 may be a chip, an encoder, an encoding circuit, or another integrated circuit that can implement the method in this application.

Optionally, the receiving module 601 and the sending module 603 may be an interface circuit or a transceiver. The receiving module 601 and the sending module 603 may be independent modules, or may be integrated into a transceiver module (not shown in the figure). The transceiver module may implement functions of the receiving module 601 and the sending module 603, and may be an interface circuit or a transceiver.

Because a specific method and embodiment have been described above, and the apparatus 600 is configured to perform a communication link initialization method corresponding to the master node, for a specifically described function related to the method, refer to a related part in the corresponding embodiment. Details are not described herein again.

Optionally, the apparatus 600 may further include a storage module (not shown in the figure). The storage module may be configured to store data and/or signaling. The storage module may be coupled to the processing module 602, or may be coupled to the receiving module 601 and the sending module 603. For example, the processing module 602 may be configured to read the data and/or signaling in the storage module, so that the communication link initialization method in the foregoing method embodiments is performed.

Figure 7:
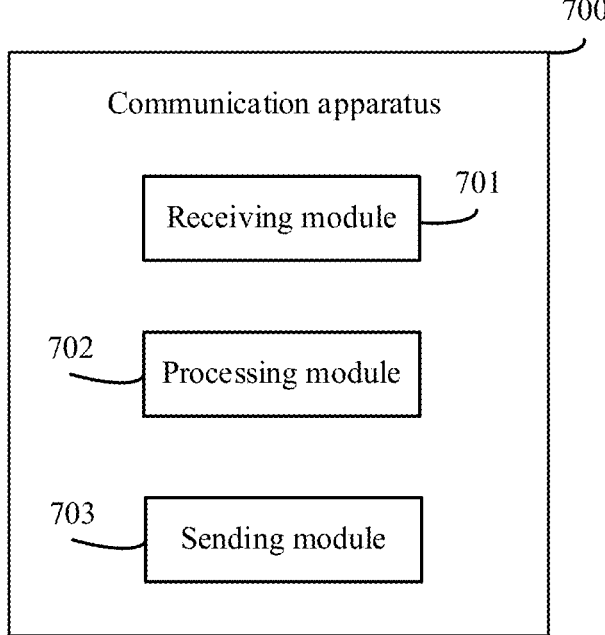
FIG. 7 is a structural block diagram of another communication apparatus according to an embodiment of this application.

FIG. 7 shows another communication apparatus 700 according to an embodiment of this application. The communication apparatus 700 may be configured to perform the communication link initialization method applied to the slave node in FIG. 3A to FIG. 3I and specific embodiments. The communication apparatus 700 includes a receiving module 701, a processing module 702, and a sending module 703.

The receiving module 701 is configured to receive a first information frame from a master node, where the first information frame includes first synchronization information.

The processing module 702 is configured to implement synchronization with the master node based on the first synchronization information.

The sending module 703 is configured to send a second information frame to the master node, where the second information frame includes second synchronization information.

The receiving module 701 is further configured to receive a third information frame from the master node, where the third information frame is used to indicate a first training information frame.

The sending module 703 is further configured to send a fourth information frame to the master node, where the fourth information frame is used to indicate a second training information frame.

The processing module 702 is further configured to train a link between the master node and a slave node based on the third information frame.

Optionally, the receiving module 701 is further configured to receive a fifth information frame that indicates a first count of remaining training information frames.

The sending module is further configured to send, to the master node, a sixth information frame that indicates a second count of remaining training information frames.

Optionally, the receiving module 701 is further configured to receive, from the master node, a seventh information frame that indicates a first ending identifier.

The sending module is further configured to send, to the master node, an eighth information frame that indicates a second ending identifier.

Optionally, that the processing module 702 is further configured to generate the fourth information frame specifically includes:

The processing module 702 determines a length of the fourth information frame based on a length of the third information frame. When the first training information frame is a reverse training information frame and the second training information frame is a forward training information frame, the length of the third information frame is an integer multiple of the length of the fourth information frame, or when the first training information frame is a forward training information frame and the second training information frame is a reverse training information frame, the length of the fourth information frame is an integer multiple of the length of the third information frame. The length is a time length or a bit length.

The processing module 702 generates the fourth information frame based on the length of the fourth information frame.

Alternatively, the communication apparatus 700 may be further configured to perform the communication link initialization method applied to the slave node in FIG. 4A and FIG. 4B and specific embodiments.

The receiving module 701 is configured to receive a ninth information frame from the master node. The ninth information frame is used to indicate fifth synchronization information and a fifth training information frame, the fifth training information frame is a forward training information frame or a reverse training information frame, the reverse training information frame includes one or more of the following information: a count of remaining reverse training information frames, a reverse training information frame type, a pre-emphasis gear, a swing gear, a MEP version number, a maximum quantity of retransmission times, a transparent transmission mode indication, active time of a CRC code block, information about a reserved bandwidth for control information transmission, a training verification function indication, a CRC code block size, and a terminator, and the forward training information frame includes one or more of the following information: a count of remaining forward training information frames, a forward training information frame number, a forward training information frame type, a pre-emphasis gear enabling indication, a swing gear, a MEP version number, a maximum quantity of retransmission times, a transparent transmission mode indication, active time of a CRC code block, a reserved bandwidth for control information transmission, a training verification function indication, a CRC code block size, and a terminator.

The processing module 702 is configured to implement synchronization with the master node based on the fifth synchronization information.

The sending module 703 is configured to send a tenth information frame to the master node. The tenth information frame is used to indicate sixth synchronization information and a sixth training information frame, and the sixth training information frame is reverse training information or forward training information.

The processing module 702 is configured to train the link between the master node and the slave node based on the ninth information frame.

Alternatively, the communication apparatus 700 may be further configured to perform the communication link initialization method applied to the slave node in FIG. 4A and FIG. 4B and specific embodiments.

The receiving module 701 is configured to receive an eleventh information frame from the master node, and implement synchronization with the slave node based on first X3 bits of the eleventh information frame, where the first X3 bits of the eleventh information frame are the same as first X3 bits of the seventh synchronization information.

The processing module 702 is configured to obtain last Z3 bits of the seventh synchronization information, and obtain a seventh training information frame based on the last Z3 bits of the seventh synchronization information and last Z3 bits of the eleventh information frame, where lengths of the eleventh information frame and the seventh synchronization information are the same and are Y3 bits, X3, Y3, and Z3 are positive integers, and X3+Z3=Y3.

The sending module 703 is configured to send a twelfth information frame to the master node. The twelfth information frame is used to indicate eighth synchronization information and an eighth training information frame, lengths of the eighth synchronization information and the twelfth information frame are the same and are equal to Y4 bits, a length of the eighth training information frame is Z4 bits, first X4 bits of the twelfth information frame are determined based on first X4 bits of the eighth synchronization information, and last Z4 bits of the twelfth information frame are obtained based on the eighth training information frame and last Z4 bits of the eighth synchronization information, where X4, Y4, and Z4 are positive integers, and X4+Z4=Y4.

The processing module 702 is further configured to train the link between the slave node and the master node based on the seventh synchronization information and the seventh training information frame.

Optionally, the processing module 702 may be a chip, an encoder, an encoding circuit, or another integrated circuit that can implement the method in this application.

Optionally, the receiving module 701 and the sending module 703 may be an interface circuit or a transceiver. The receiving module 701 and the sending module 703 may be independent modules, or may be integrated into a transceiver module (not shown in the figure). The transceiver module may implement functions of the receiving module 701 and the sending module 703, and may be an interface circuit or a transceiver.

Because a specific method and embodiment have been described above, and the apparatus 700 is configured to perform a communication link initialization method corresponding to a network device, for specific descriptions related to the method, refer to related parts in the corresponding embodiment. Details are not described herein again.

Optionally, the apparatus 700 may further include a storage module (not shown in the figure). The storage module may be configured to store data and/or signaling. The storage module may be coupled to the processing module 702, or may be coupled to the receiving module 701 and the sending module 703. For example, the processing module 702 may be configured to read the data and/or signaling in the storage module, so that the communication link initialization method in the foregoing method embodiments is performed.

Figure 8:
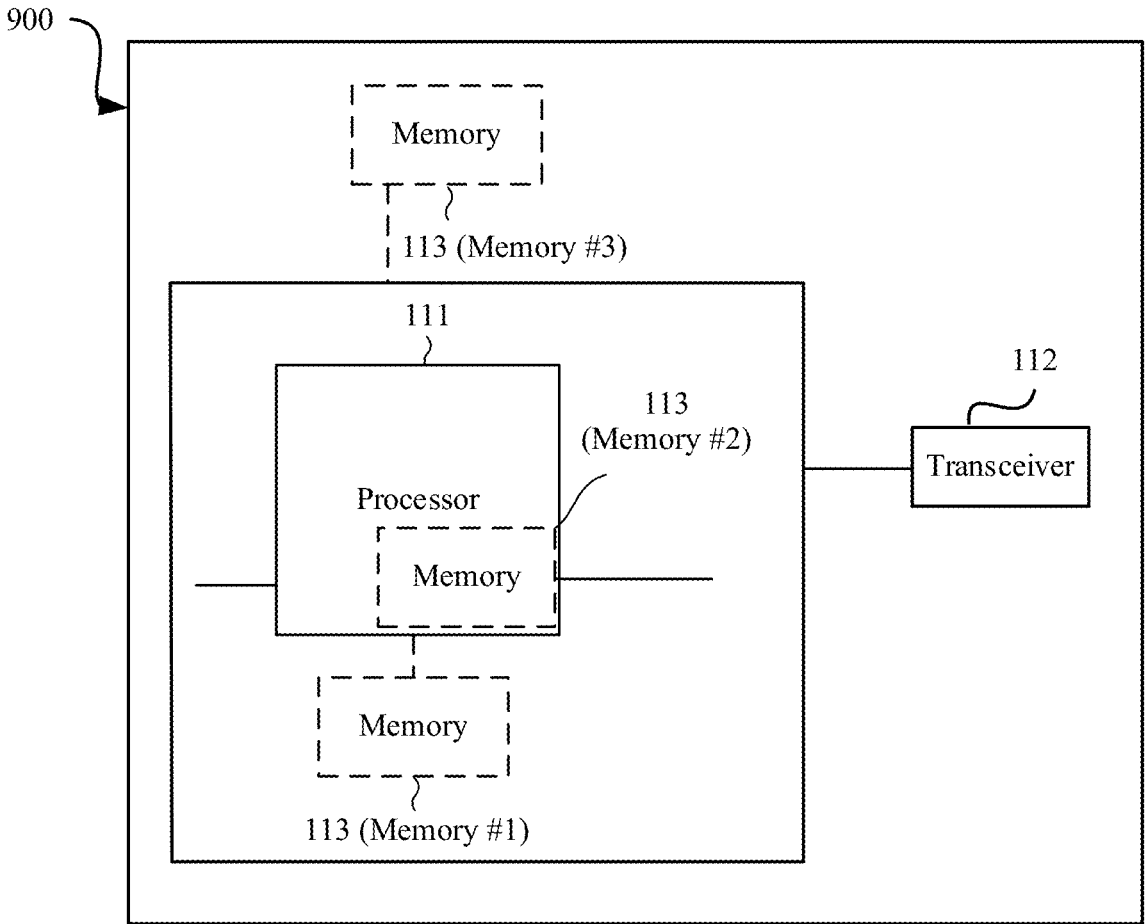
FIG. 8 is a schematic diagram of a structure of a communication apparatus according to an embodiment of this application.

FIG. 8 is a schematic diagram of a structure of a communication apparatus according to an embodiment of this application. For structures of the master node and the slave node, refer to the structure shown in FIG. 8. The communication apparatus 900 includes a processor 111 and a transceiver 112. The processor 111 and the transceiver 112 are electrically coupled.

The processor 111 is configured to execute some or all computer program instructions in a memory, and when the some or all computer program instructions are executed, the apparatus is enabled to perform the method in any one of the foregoing embodiments.

The transceiver 112 is configured to communicate with another device.

Optionally, a memory 113 is further included, and is configured to store computer program instructions. Optionally, the memory 113 (Memory #1) is located in the apparatus, the memory 113 (Memory #2) is integrated with the processor 111, or the memory 113 (Memory #3) is located outside the apparatus.

It should be understood that the communication apparatus 900 shown in FIG. 8 may be a chip or a circuit, for example, may be a chip or a circuit that may be disposed in a terminal apparatus or a communication apparatus. Alternatively, the transceiver 112 may be a communication interface. The transceiver includes a receiver and a transmitter. Further, the communication apparatus 900 may further include a bus system.

The processor 111, the memory 113, and the transceiver 112 are connected through the bus system. The processor 111 is configured to execute the instructions stored in the memory 113, to control the transceiver to receive a signal and send a signal, to complete steps performed by a first device or a second device in the implementation method in this application. The memory 113 may be integrated into the processor 111, or may be disposed separately from the processor 111.

In an implementation, it may be considered that functions of the transceiver 112 are implemented through a transceiver circuit or a dedicated transceiver chip. It may be considered that the processor 111 is implemented through a dedicated processing chip, a processing circuit, a processor, or a general-purpose chip. The processor may be a central processing unit (CPU), a network processor (NP), or a combination of a CPU and an NP. The processor may further include a hardware chip or another general-purpose processor. The hardware chip may be an application-specific integrated circuit (ASIC), a programmable logic device (PLD), or a combination thereof. The PLD may be a complex PLD (CPLD), a field-programmable gate array (FPGA), generic array logic (GAL), another programmable logic device thereof, a discrete gate or transistor logic device, a discrete hardware component, or any combination thereof. The general-purpose processor may be a microprocessor, or the processor may be any conventional processor or the like.

It may be further understood that the memory mentioned in this embodiment of this application may be a volatile memory or a nonvolatile memory, or may include a volatile memory and a nonvolatile memory. The nonvolatile memory may be a read-only memory (ROM), a programmable ROM (PROM), an erasable PROM (EPROM), an electrically EPROM (EEPROM), or a flash memory. The volatile memory may be a random-access memory (RAM), and is used as an external cache. For example, but not for limitative description, many forms of RAM are available, such as a static RAM (SRAM), a dynamic RAM (DRAM), a synchronous DRAM (SDRAM), a double data rate (DDR) SDRAM, an enhanced SDRAM (ESDRAM), a synchlink DRAM (SynchLink DRAM), and a direct Rambus (DR) RAM. It should be noted that the memory described in this application is intended to include but is not limited to these memories and any memory of another proper type.

An embodiment of this application provides a computer-readable storage medium, storing a computer program. The computer program is used to perform the method applied to the master node in the foregoing embodiments.

An embodiment of this application provides a computer-readable storage medium, storing a computer program. The computer program is used to perform the method applied to the slave node in the foregoing embodiments.

An embodiment of this application provides a computer program product including instructions. When the computer program product runs on a computer, the computer is enabled to perform the method applied to the master node in the foregoing embodiments.

An embodiment of this application provides a computer program product including instructions. When the computer program product runs on a computer, the computer is enabled to perform the method applied to the slave node in the foregoing embodiments.

It should be understood that sequence numbers of the foregoing processes do not mean execution sequences in embodiments of this application. The execution sequences of the processes should be determined based on functions and internal logic of the processes, and should not constitute any limitation on implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in another manner. For example, the foregoing apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, function units in embodiments of this application may be integrated into one processing unit, each of the units may exist alone physically, or two or more units are integrated into one unit.

When functions are implemented in a form of a software function unit and sold or used as an independent product, the functions may be stored in a computer-readable storage medium. Based on such an understanding, all or some of the technical solutions of this application may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes: any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method implemented by a master node, wherein the method comprises:

sending, to a slave node, a ninth information frame comprising fifth synchronization information and a fifth training information frame, wherein the fifth training information frame is a forward training information frame or a reverse training information frame, wherein the reverse training information frame comprises one or more of a reverse training information frame type, a pre-emphasis gear, or a first swing gear, wherein the reverse training information frame type identifies a type of the reverse training information frame, wherein the pre-emphasis gear configures a pre-emphasis level of a second end that sends the forward training information frame, wherein the first swing gear configures a first transmit swing of the second end, wherein the forward training information frame comprises one or more of a first count of remaining forward training information frames, a forward training information frame type, or a second swing gear, wherein the forward training information frame type identifies a type of the forward training information frame, and wherein the second swing gear configures a second transmit swing of a first end that sends the reverse training information frame.

2. The method of claim 1, further comprising:

receiving, from the slave node, a tenth information frame comprising sixth synchronization information and a sixth training information frame, wherein the sixth training information frame is the reverse training information frame or the forward training information frame;

implementing synchronization with the slave node based on the sixth synchronization information; and training a link between the master node and the slave node based on the tenth information frame.

3. The method of claim 1, wherein the reverse training information frame further comprises one or more of a second count of remaining reverse training information frames, a first media encapsulation protocol (MEP) version number, a first maximum quantity of retransmission times, a first transparent transmission mode indication, a first active time of a cyclic redundancy check (CRC) code block, a first reserved bandwidth for control information transmission, a first training verification function indication, a first CRC code block size, or a first terminator.

4. The method of claim 1, wherein the forward training information frame further comprises one or more of a forward training information frame number, a pre-emphasis gear enabling indication, a second MEP version number, a second maximum quantity of retransmission times, a second transparent transmission mode indication, a second active time of a CRC code block, a second reserved bandwidth for control information transmission, a second training verification function indication, a second CRC code block size, or a second terminator.

5. The method of claim 2, wherein either the fifth training information frame is the forward training information frame and the sixth training information frame is the reverse training information frame, or the fifth training information frame is the reverse training information frame and the sixth training information frame is the forward training information frame.

6. The method of claim 1, wherein the first count identifies a quantity of remaining to-be-sent forward training information frames.

7. The method of claim 3, wherein the second count indicates a quantity of remaining to-be-sent reverse training information frame, wherein the first MEP version number indicates a MEP version number supported by the first end that sends the reverse training information frame, wherein the first maximum quantity of retransmission times configures a maximum quantity of retransmission times of information transmission of a third end, wherein the first transparent transmission mode indication indicates the first end whether to enable a transparent transmission mode, wherein the first active time identifies an active time of a correspondingly-transmitted CRC code block in a first information transmission process of the first end, wherein the first reserved bandwidth configures a bandwidth proportion occupied by control information transmission in a second information transmission process of the third end, wherein the first training verification function indication indicates that the first end can jump from a training state to a training verification state, wherein the training state is a first state in which the master node and the slave node perform link training, wherein the training verification state is a second state in which the master node and the slave node verify a result of the link training, wherein the first CRC code block size identifies a size of a CRC code block correspondingly transmitted in the first information transmission process, and wherein the first terminator identifies a termination of the reverse training information frame.

8. The method of claim 4, wherein the forward training information frame number identifies a number of the forward training information frame, wherein the pre-emphasis gear enabling indication identifies a pre-emphasis gear used by a third end, wherein the second MEP version number indicates a MEP version number supported by the second third end, wherein the second maximum quantity of retransmission times configures a maximum quantity of retransmission times of a first information transmission process of a fourth end, wherein the second transparent transmission mode indication indicates the second end whether to enable a transparent transmission mode, wherein the second active time identifies active time of a correspondingly-transmitted CRC code block in a second information transmission process of the third end, wherein the second reserved bandwidth configures a bandwidth proportion occupied by control information transmission in the first information transmission process, wherein the second training verification function indication indicates whether the third end jumps from a training state to a training verification state, wherein the second CRC code block size identifies a size of a CRC code block correspondingly transmitted in the second information transmission process, and wherein and the second terminator identifies a termination of the forward training information frame.

9. The method of claim 2, wherein the fifth synchronization information or the sixth synchronization information comprises a scrambling code, and wherein the fifth synchronization information or the sixth synchronization information are for scrambling code synchronization.

10. The method of claim 1, wherein lengths of the fifth synchronization information and the ninth information frame are the same and are equal to Y3 bits, wherein a length of the fifth training information frame is Z3 bits, wherein first X3 bits of the ninth information frame are based on first X3 bits of the fifth synchronization information, wherein last Z3 bits of the ninth information frame are based on the fifth training information frame and last Z3 bits of the fifth synchronization information, wherein X3, Y3, and Z3 are positive integers, and wherein X3+Z3=Y3.

11. The method of claim 2, wherein implementing synchronization comprises implementing synchronization with the slave node based on first X4 bits of the tenth information frame, and wherein the first X4 bits are the same as first X4 bits of the sixth synchronization information.

12. The method of claim 2, further comprising:
obtaining last Z4 bits of the sixth synchronization information; and
obtaining the sixth training information frame based on the last Z4 bits of the sixth synchronization information and last Z4 bits of the tenth information frame, wherein lengths of the tenth information frame and the sixth synchronization information are the same and are Y4 bits, wherein X4, Y4, and Z4 are positive integers, and wherein X4+Z4=Y4.

13. The method of claim 2, wherein training the link comprises training the link between the master node and the slave node based on the sixth synchronization information and the sixth training information frame.

14. An apparatus comprising:
a memory configured to store instructions; and
a processor coupled to the memory and configured to execute the instructions to cause the apparatus to:
send, to a slave node, a ninth information frame comprising fifth synchronization information and a fifth training information frame,
wherein the fifth training information frame is a forward training information frame or a reverse training information frame, wherein the reverse training information frame comprises one or more of a reverse training information frame type, a pre-emphasis gear, or a first swing gear, wherein the reverse training information frame type identifies a type of the reverse training information frame, wherein the pre-emphasis gear configures a pre-emphasis level of a second end that sends the forward training information frame, wherein the first swing gear configures a first transmit swing of the second end, wherein the forward training information frame comprises one or more of a first count of remaining forward training information frames, a forward training information frame type, or a second swing gear, wherein the forward training information frame type identifies a type of the forward training information frame, and wherein the second swing gear configures a second transmit swing of a first end that sends the reverse training information frame.

15. The apparatus of claim 14, wherein the instructions further cause the apparatus to:
receive, from the slave node, a tenth information frame comprising sixth synchronization information and a sixth training information frame, wherein the sixth training information frame is the reverse training information frame or the forward training information frame;

implement synchronization with the slave node based on the sixth synchronization information; and train a link between the apparatus and the slave node based on the tenth information frame.

16. The apparatus of claim 14, wherein the reverse training information frame further comprises one or more of a second count of remaining reverse training information frames, a media encapsulation protocol (MEP) version number, a maximum quantity of retransmission times, a transparent transmission mode indication, active time of a cyclic redundancy check (CRC) code block, information about a reserved bandwidth for control information transmission, a training verification function indication, a CRC code block size, or a terminator.

17. The apparatus of claim 14, wherein the forward training information frame further comprises one or more of a forward training information frame number, a pre-emphasis gear enabling indication, a MEP version number, a maximum quantity of retransmission times, a transparent transmission mode indication, active time of a CRC code block, a reserved bandwidth for control information transmission, a training verification function indication, a CRC code block size, or a terminator.

18. The apparatus of claim 15, wherein either the fifth training information frame is the forward training information frame and the sixth training information frame is the reverse training information frame, or the fifth training information frame is the reverse training information frame and the sixth training information frame is the forward training information frame.

19. The apparatus of claim 14, wherein the first count of remaining forward training information frames identifies a quantity of remaining to-be-sent forward training information frames.

20. A computer program product comprising computer-executable instructions that are stored on a non-transitory computer storage medium and that, when executed by a processor, cause an apparatus to:

send, to a slave node, a ninth information frame comprising fifth synchronization information and a fifth training information frame, wherein the fifth training information frame is a forward training information frame or a reverse training information frame, wherein the reverse training information frame comprises one or more of a reverse training information frame type, a pre-emphasis gear, or a first swing gear, wherein the reverse training information frame type identifies a type of the reverse training information frame, wherein the pre-emphasis gear configures a pre-emphasis level of a second end that sends the forward training information frame, wherein the first swing gear configures a first transmit swing of the second end, wherein the forward training information frame comprises one or more of a first count of remaining forward training information frames, a forward training information frame type, or a second swing gear, wherein the forward training information frame type identifies a type of the forward training information frame, and wherein the second swing gear configures a second transmit swing of a first end that sends the reverse training information frame.

* * * * *